United States Patent
Soemer et al.

[19]

[11] Patent Number: 5,860,443
[45] Date of Patent: Jan. 19, 1999

[54] RAPID RELEASE MECHANISM WITH DAMPING CONTROL

[75] Inventors: John Soemer, Flanders; Peter Materna, Metuchen; Michael Dosch, Lake Hiawatha; Richard Moakes, Flemington; Geoffrey Lawrence Mahon, Ridgewood, all of N.J.

[73] Assignee: Breed Automotive Technology, Inc., Lakeland, Fla.

[21] Appl. No.: 808,724

[22] Filed: Feb. 28, 1997

[51] Int. Cl.⁶ .................................................. F16K 31/128
[52] U.S. Cl. ................................................. 137/69; 251/48
[58] Field of Search ................................ 137/68.23, 69; 251/144, 48

[56] References Cited

U.S. PATENT DOCUMENTS

| | | | |
|---|---|---|---|
| 1,874,356 | 8/1932 | Rowley | 137/69 |
| 3,017,894 | 1/1962 | Chilevot | 137/69 |
| 4,520,838 | 6/1985 | Fisher et al. | 137/69 |
| 4,619,285 | 10/1986 | Piet | 137/69 X |

*Primary Examiner*—John Fox
*Attorney, Agent, or Firm*—L. R. Drayer

[57] ABSTRACT

A release mechanism for releasing pressurized fluid from an associated pressure vessel has sealing means for use in sealing an opening in the associated pressure vessel, supporting means for supporting the sealing means, first opening means for selectively opening the sealing means by removing the supporting means and, damping control means for damping the supporting means and also regulating the release of the high pressure fluid. To release pressurized fluid from the pressure vessel, the supporting means is removed out of supporting relationship with a sealing means. Next the supporting means is moved along its axis without damping, then with damping and, finally, with relatively light damping.

41 Claims, 24 Drawing Sheets

RAPID RELEASE MECHANISM WITH DAMPING CONTROL

BACKGROUND OF THE INVENTION

1. Field of Invention

This invention pertains to the art of methods and apparatuses for use with high pressure fluid systems, and more specifically to methods and apparatuses for use in releasing high pressure fluid from an associated pressure vessel.

2. Description of the Related Art

It is well known in various technologies to require the rapid release of pressurized fluid from a pressure vessel in a controlled manner. A prime example is airbags and similar vehicular inflatable restraints which need to release the pressurized fluid quickly and yet also have a requirement that at the very beginning of the discharge the release should be somewhat gentle. Other technologies may also have similar needs. For example safety relief valves for overpressure protection of a pressure vessel may have downstream piping which could be subject to damage from fluid hammer phenomena if the initial opening were instantaneous.

A release mechanism of the type being described typically involves some form of rupture disc. Rupture discs are widely used for overpressure relief and are simple and, if carefully made, predictable. Most commonly they are used in the mode where they spontaneously rupture if the pressure difference across them is too large. In this sense, many pressure vessels in use today in many industries are protected by rupture discs. For use in a situation where the discharge is to be performed selectively, it is possible to use a classical rupture disc by puncturing it with an actuating mechanism which generates mechanical force and motion. However, attention must be paid to insure that a localized puncture will indeed cause the disc to rupture wide open. In practice it is found that if a rupture disc is punctured in a localized place, tearing wide open subsequent to the puncture only occurs if the pressure behind the disc is more than approximately 60% to 70% of the spontaneous rupture pressure. If the pressure is less, then a puncture will remain a localized hole and will not propagate to complete failure of the rupture disc. This is true even for the so-called scored rupture discs, in which indentations are stamped or coined into one side of the disc to promote failure. Thus, such a release mechanism is limited to conditions where the internal pressure remains in the appropriate range, which may not be the case if the pressure vessel is subject to a wide range of temperatures.

In situations where the conditions for the rupture disc to tear open completely upon puncture are not met, a solution may be to simply use enough explosive so that the entire rupture disc is literally blasted away or to drive a sufficiently powerful cutter to cut out the rupture disc all around its circumference. However, this would require a relatively large quantity of explosive and in some circumstances such a quantity of explosive may not be desirable.

Accordingly, one general category of alternative release mechanism is that of a very weak rupture disc supported by a more robust support, wherein the support is withdrawn selectively. One existing example of this is Okada U.S. Pat. No. 4,289,327 in which the support is supported by a link mechanism. In this patent the link mechanism is directly actuated by the motion of a mass in the sensing device which operates on mechanical principles. This is possibly delicate or overly sensitive in that the link is only slightly over-center and is designed so that it can be pushed to the other side of center by a very slight force. Furthermore, electronics are now frequently involved in the process of deciding whether to deploy the inflator, and so it is desirable to actuate the inflator using an electrical signal.

All of the known prior art in the withdrawn-support category of release mechanisms provide a release which is essentially instantaneous producing a very abrupt jump in the flow rate as soon as the rupture disc ruptures. The release of pressurized fluid is such that the flow rate is zero before the event, then rises essentially instantaneously to its maximum value at the beginning of discharge (when the pressure inside the storage vessel is greatest) and then decays. The exiting flow rate as a function of time may approximate a decaying exponential curve. However, in the airbag industry it is desirable to provide a controlled release which is referred to as pulse-shaping. It is desirable that at the very earliest part of the deployment the flow rate should be limited so as to avoid over stressing the bag or attachments during unfolding, and so as to avoid causing injury to an out-of-position occupant who may be positioned too close to the dashboard of the vehicle. After the brief initial period representing unfolding, a faster discharge rate is desired, and the discharge rate eventually decays due to depletion of the source. Even further, in the airbag industry it is desirable that the characteristics of the discharge, especially its earliest portion, be adjustable as a function of vehicular and occupant variables that may be measured just prior to initiation of the discharge. Two other features which are desirable in the airbag industry are, a self-relieving function for overpressure protection, and measuring or monitoring of the pressure of the contents of the vessel.

SUMMARY OF THE INVENTION

In accordance with one aspect of the invention there is provided a release mechanism for releasing high pressure fluid from an associated pressure vessel. The release mechanism has sealing means for use in sealing an opening in the associated pressure vessel, supporting means for supporting the sealing means, first opening means for selectively opening the sealing means by removing the supporting means and, damping control means for damping the supporting means and thus regulating the release of the high pressure fluid.

In accordance with another aspect of the invention there is provided a damping control mechanism for damping the motion of a piston. The damping control mechanism has a damper body with a cylinder that receives the piston, a damping substance located within the cylinder, a first collecting region for collecting the damping substance and, a first bleed hole.

In accordance with another aspect of the invention there is provided a method of releasing pressurized fluid from an associated pressure vessel. First, a supporting means is removed out of supporting relationship with a sealing means. Next the supporting means is moved along its axis without damping, then with damping and, finally, with relatively light damping.

In accordance with another aspect of the invention there is provided another method of releasing pressurized fluid from an associated pressure vessel. First, a supporting means is removed out of supporting relationship with a sealing means. Next, an exit flow area is opened to a first area A1 so that the pressurized fluid can be released at a first flow rate R1. Then an exit flow area is opened to a second area A2 so that the pressurized fluid can be released at a second flow rate R2.

In accordance with yet another aspect of the invention there is provided a method for damping the motion of a piston. The piston is moved into a first cylindrical bore of a damper body. Then, a damping substance is pushed through a first bleed hole. Finally, the damping substance is collected in a first collecting region.

It is an object of the present invention to provide a release mechanism which functions successfully over a wide range of storage pressures, such as may result from a wide range of environmental temperatures.

It is further an object of the invention to provide a release mechanism which is actuated from an electrical signal.

It is further an object of the invention that this release be accomplished using an actuator of modest energy such as a self-contained actuator containing a minimal amount of explosive material.

It is further an object of the invention to achieve actuation without adding the combustion products of explosives to the exiting pressurized fluid, so that the exiting pressurized fluid is completely clean.

It is further an object of the invention to provide a discharge with a relatively gentle discharge during the very earliest portion of the discharge, so as to meet the needs of the airbag industry for so-called pulse-shaping.

It is further an object of the invention that the characteristics of this pulse-shaping can be adjusted to produce an intelligent airbag system responsive to such inputs as the weight of the vehicle occupant, the speed of the crash and the position of the occupant at the time of the crash.

It is further an object of the invention that this discharge mechanism be able to provide spontaneous release of the contents of the pressure vessel to provide overpressure protection.

It is further an object of the invention to provide opportunity for measuring or monitoring the pressure of the contents of the vessel.

These benefits and advantages as well as many others will become apparent to those skilled in the art to which this invention pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 19 is a simplified side view that illustrates the surface area of an imaginary cylinder that the pressurized fluid at a second flow rate passes through.

DESCRIPTION OF THE PREFERRED EMBODIMENT

Figure 1:
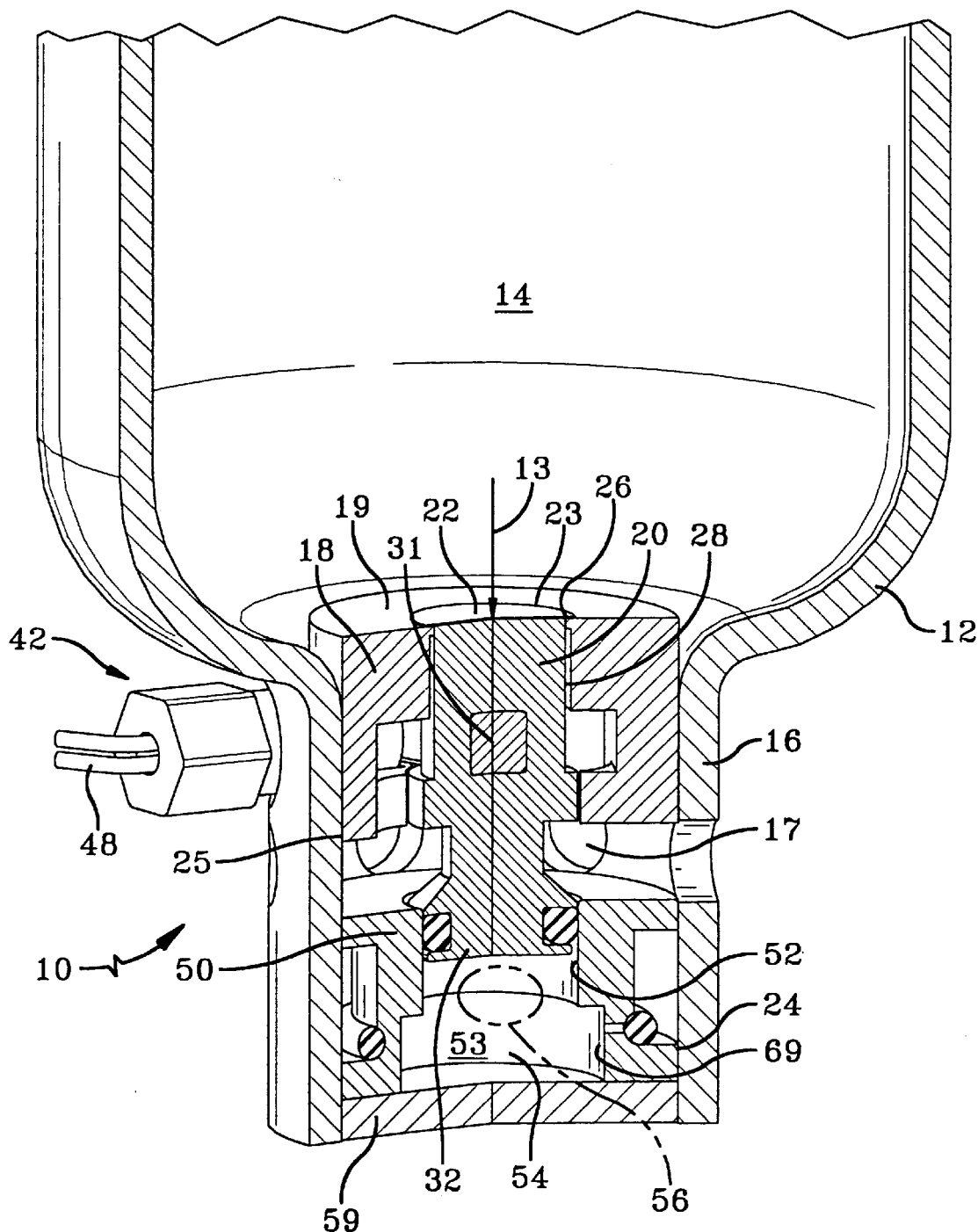
FIG. 1 is a cutaway side view of the spin-and-drop release mechanism of this invention shown prior to the release of pressurized fluid.
Figure 2:
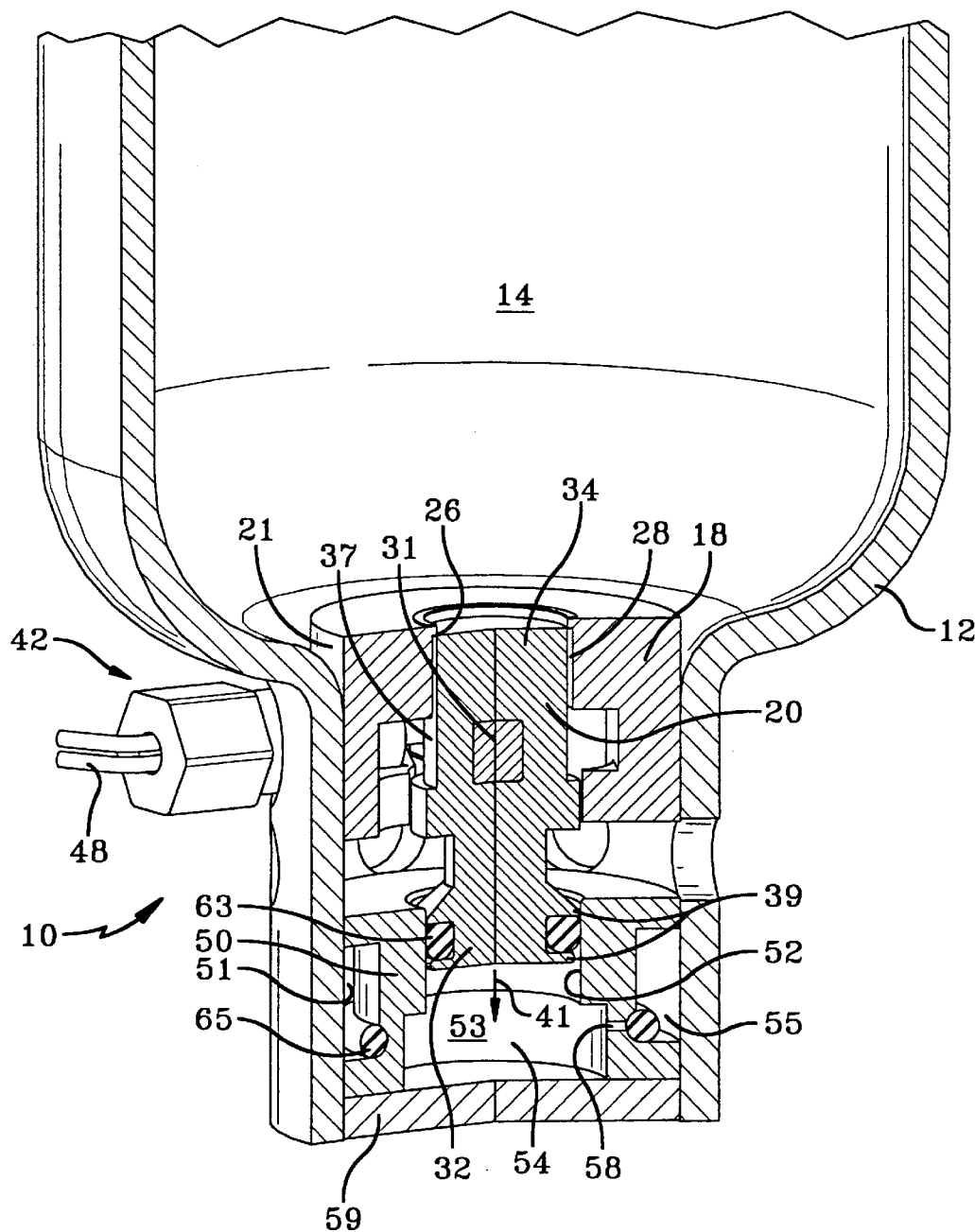
FIG. 2 is a cutaway side view showing the release mechanism after the rupture disc has been ruptured and the free descent stage has been completed.
Figure 3:
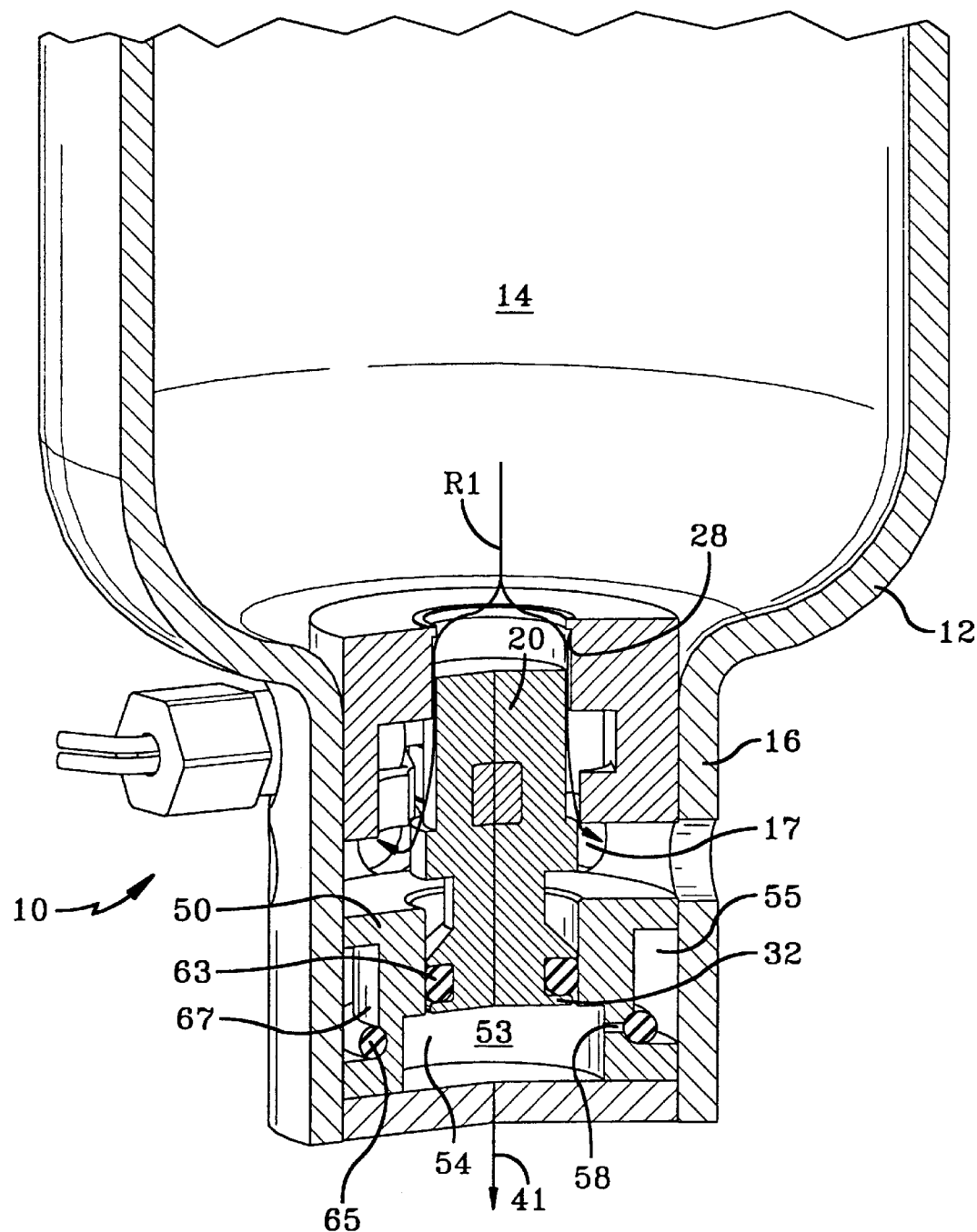
FIG. 3 is a cutaway side view showing the release mechanism in the midst of the highly damped descent stage and illustrating the first flow rate of pressurized fluid out of the release mechanism.
Figure 4:
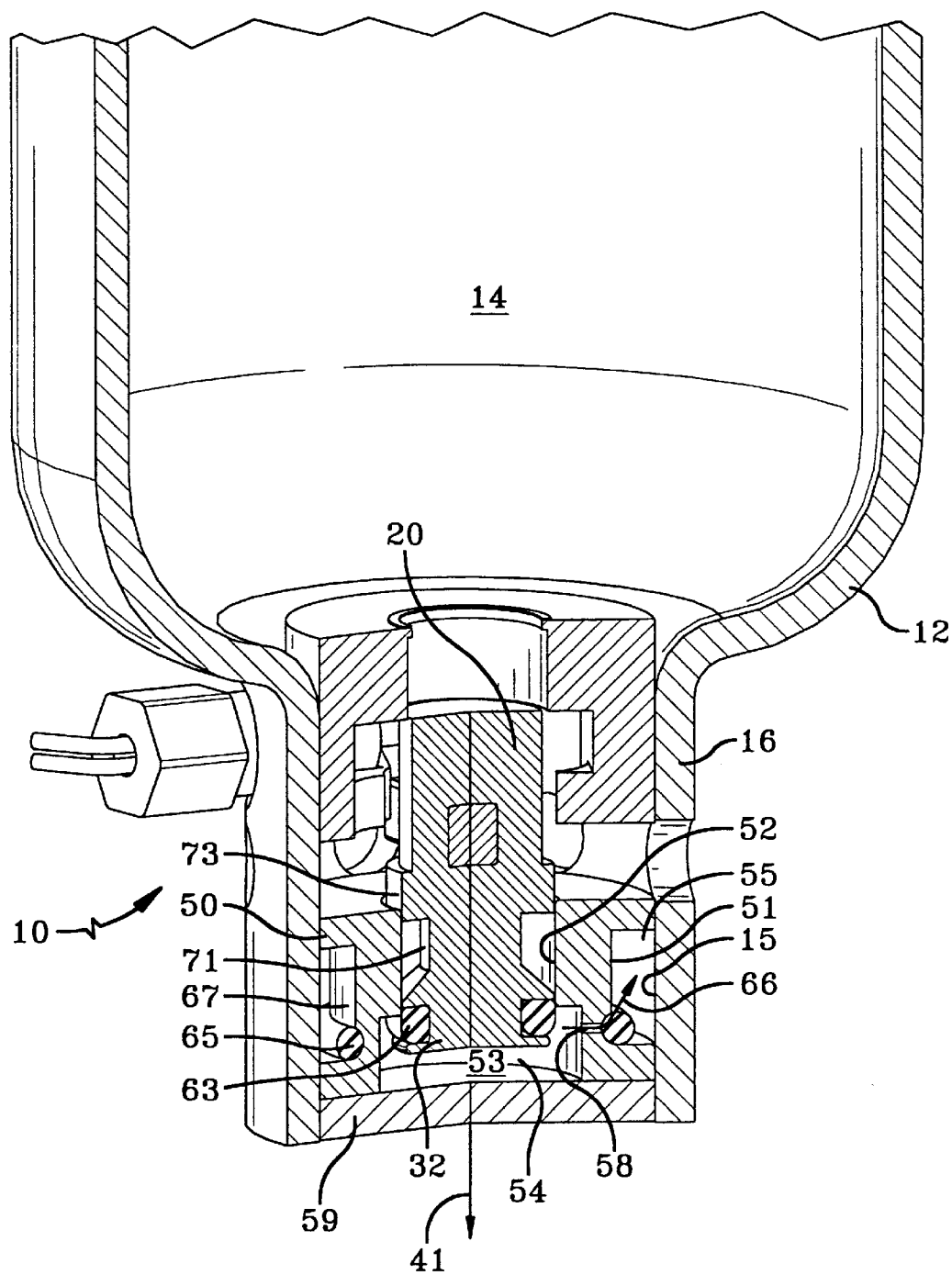
FIG. 4 is a cutaway side view showing the release mechanism at the beginning of the lightly damped descent stage illustrating the first damping substance flowpath.

Referring now to the drawings wherein the showings are for purposes of illustrating a preferred embodiment of the invention only and not for purposes of limiting the same, FIGS. 1–5 show the release mechanism 10, herein after known as the spin-and-drop embodiment, of the present invention. This invention works with both compressible and non-compressible fluids over a very wide pressure and temperature range. Although the embodiments herein disclosed are directed to vehicle occupant inflatable restraints, this invention is applicable to fire suppression systems and other uses as well. To assist in explanation, the following discussion will be divided into the five primary stages used in the deployment of the release mechanism 10. After that, additional features and embodiments will be discussed. The first stage, shown in FIG. 1, is the support stage which is the position occurring during normal driving prior to the release of pressurized fluid 14. The second stage, which occurs between FIG. 1 and FIG. 2, is the removal of support stage. In this stage, rotor 20 is moved out of its supporting relation with rupture disc 22. Stage three, which also occurs between FIG. 1 and FIG. 2, is the free descent stage. This stage features the descent of rotor 20 wherein it free falls, i.e., nothing restricts or damps its descent. FIG. 2 shows stage three at its completion. The fourth stage, which occurs between FIG. 2 and FIG. 4, is the highly damped descent stage. In this stage, the descent of rotor 20 is controlled or damped by damping substance 53. The damped motion of rotor 20 is used to regulate the release of pressurized fluid 14. The fifth and final stage, which occurs beginning with FIG. 4, is the lightly damped descent stage. For this stage, the damping of rotor 20's descent is reduced allowing the remaining pressurized fluid 14 to exit the release mechanism 10 more rapidly.

Stage 1—The Support Stage

Figure 18:
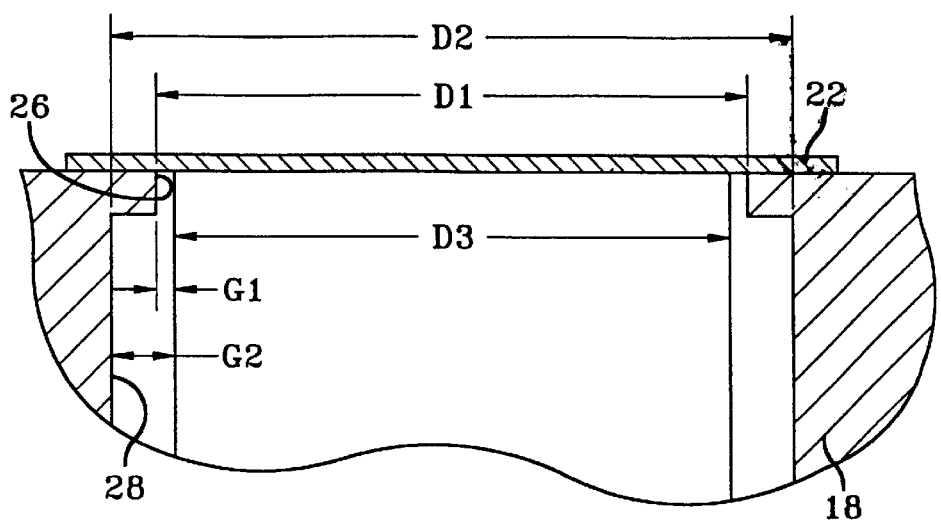
FIG. 18 is a close-up side view of the rotor shown supporting the rupture disc that also shows first and second annular gaps between the rotor and first and second cylindrical bores.

With reference to FIGS. 1 and 18, the release mechanism 10 is for use with a pressure vessel 12 which contains pressurized fluid 14. Pressure vessel 12 is generally cylindrical and necks down to a skirt 16 which has holes 17 for diffusing the pressurized fluid 14 into an associated air bag (not shown). The release mechanism 10 includes rotor holder 18 which holds rotor 20. Mounted across upper surface 19 of rotor holder 18 is rupture disc 22. Rupture disc 22, which is best seen in FIG. 18, is a flat piece of foil or shim stock, since this is well suited to the present application and is the simplest and most inexpensive way to make a rupture disc. It should be noted that other known rupturable disc means chosen with sound engineering judgement can also be used in this invention. Since rupture disc 22 forms part of the pressure boundary against leakage of the pressurized fluid 14 while it is stored within pressure vessel 12, it is welded to rotor holder 18 by weld 23. Similarly, rotor holder 18 is fixedly attached to skirt 16 by weld 25 which is a structural connection between rotor holder 18 and pressure vessel 12 and also forms part of the pressure boundary.

With continuing reference to FIGS. 1 and 18, rupture disc 22 is relatively weak compared to the pressure of the pressurized fluid 14 which is sealed within pressure vessel 12. In other words, if it did not have some kind of support underneath it, rupture disc 22 by itself would be far too weak to withstand the pressure and would rupture spontaneously. This feature makes it possible to insure that the present invention will successfully open selectively even at pressures much lower than the maximum design pressure. When it is supported, on the other hand, rupture disc 22 maintains the integrity of the pressure boundary. In this embodiment, the rupture disc 22 is supported by rotor 20.

With reference to FIG. 1, release mechanism 10 also includes damper body 50 which is fixedly attached to skirt 16 by weld 24. Damper body 50 has first and second cylindrical bores 52, 69 which enable damper body 50 to operate as a cylinder as will be discussed further below. Within damper body 50, below lower end 32 of rotor 20, is a holding region 54 which is filled with a damping substance 53. For some applications such as airbags, the damping substance 53 is preferably a hydraulic fluid. In such cases various liquids that are incompressible or nearly incompressible chosen with sound engineering judgment can be used for the damping substance 53. An example is the petroleum-based hydraulic fluid typically used in automotive brake cylinders, whose properties have been found to be reasonably insensitive to changes in ambient temperature. For other applications, however, it may be desirable to place a compressible fluid within holding region 54. If, for example, the pressurized fluid 14 was carbon dioxide, it may be advantageous to use air as the damping substance 53. In general any fluid chosen with sound engineering judgment could be used for the damping substance 53. The bottom of damper body 50 is closed off by closure plate 59 which is shown as a separate part attached to either damper body 50 or skirt 16, although it could be made integral with damper body 50.

With reference now to FIGS. 1, 10–13 and 18, rotor holder 18 has, as best seen in FIG. 18, a first cylindrical bore 26 having a diameter D1 which is preferably concentric with outer surface 21 of rotor holder 18. Disposed farther from rupture disc 22, rotor holder 18 has a second cylindrical bore 28 which is concentric with first cylindrical bore 26 and has a diameter D2 which is preferably larger than diameter D1. The axial positions of first and second cylindrical bores 26, 28 are parameters which are important in determining damping characteristics as will be discussed further below.

Figure 10:
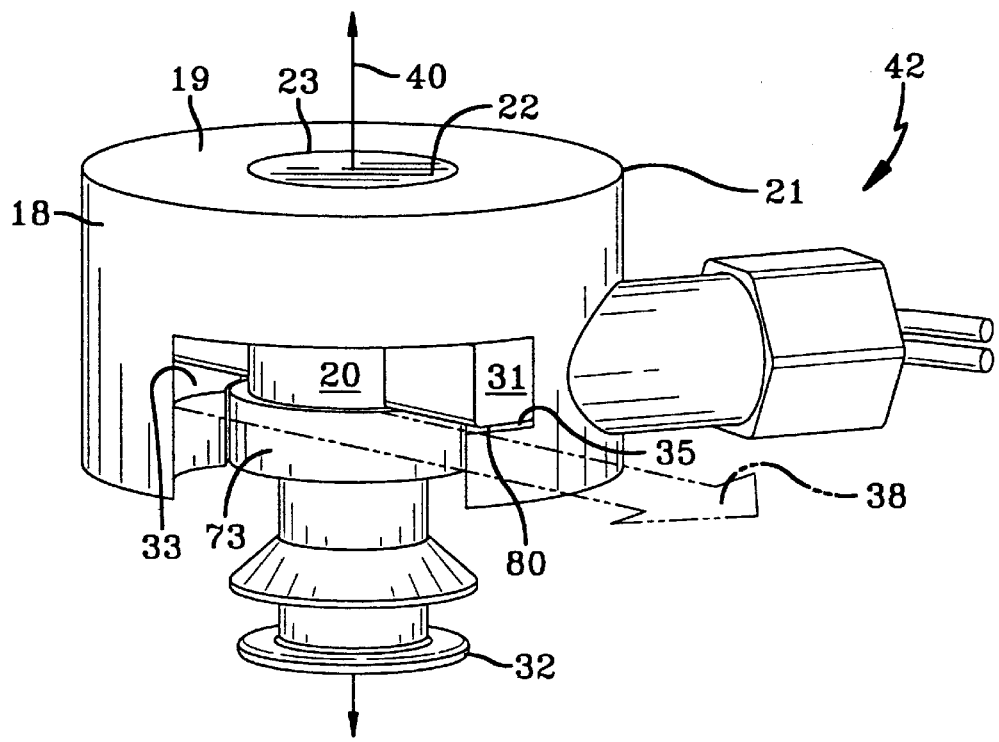
FIG. 10 is a perspective top-side view of the rotor and rotor holder of this invention showing the arms of the rotor supported by the ears of the rotor holder and showing the axis of rotation of the rotor.
Figure 11:
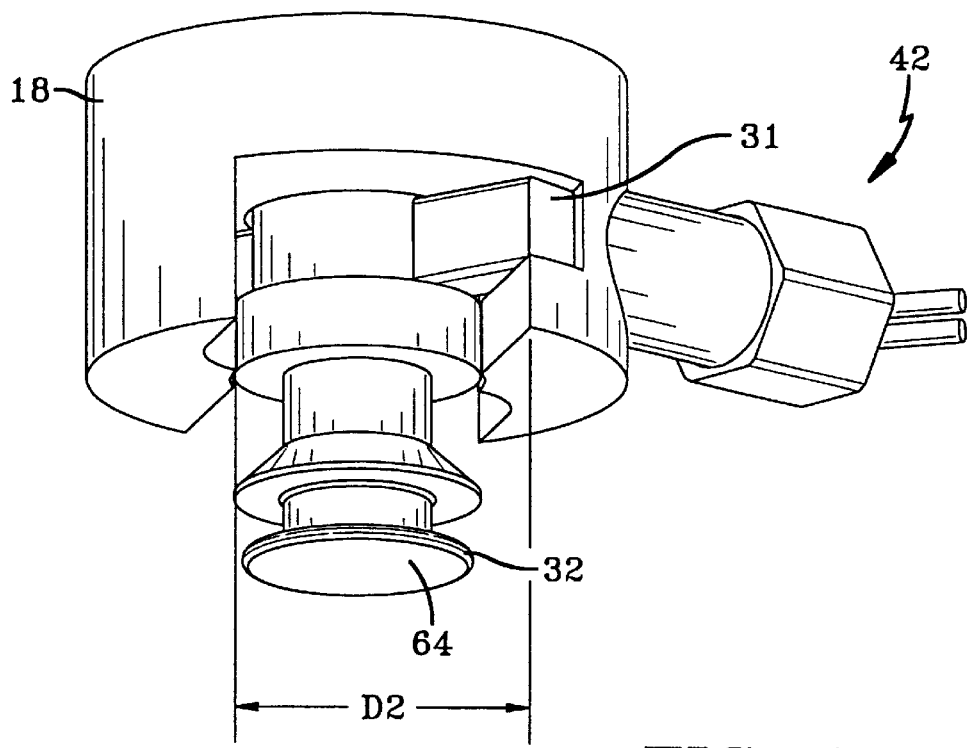
FIG. 11 is a perspective bottom-side view of the rotor and rotor holder of this invention showing the arms of the rotor supported by the ears of the rotor holder and showing the bottom surface of the lower end of the rotor.
Figure 12:
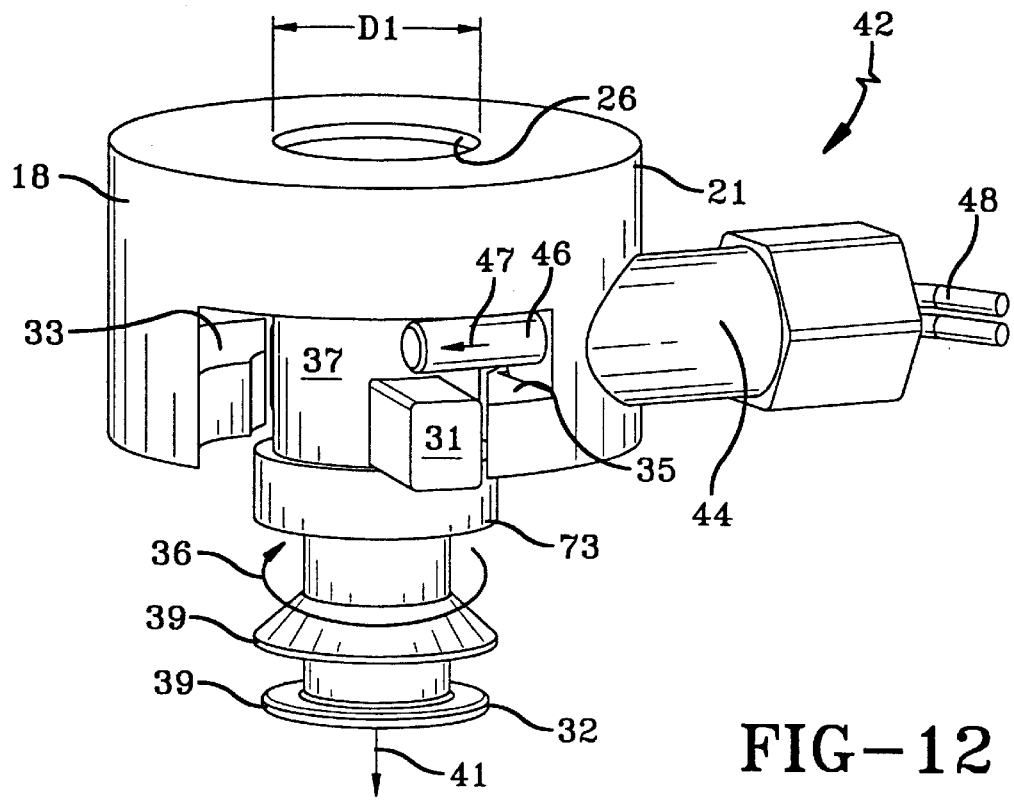
FIG. 12 is a perspective top-side view of the rotor and rotor holder of this invention showing the arms of the rotor no longer supported by the ears of the rotor holder and illustrating how the piston of the protractor pushes the first arm of the rotor.

With reference to FIGS. 1 and 6–13, rotor 20 has upper surface 30 which in this embodiment is generally round and contacts the bottom portion of ruptures disc 22, supporting it against the pressure of the pressurized fluid 14. The rotor 20 has first and second arms 29, 31 that extend out from its axis. Preferably first and second arms 29, 31 are substantially perpendicular to the axis of the rotor. It may also be desirable, however, to position first and second arms 29, 31 at angles that are not perpendicular to the axis of rotor 20. In this preferred embodiment, first and second arms 29, 31 are spaced in the range of 90° to 180° apart from each other. They are shown 180° apart from each other in the FIGURES. First and second arms 29, 31 are received by first and second ears 33, 35. The pressurized fluid 14 exerts a pressure force 13 on the relatively flimsy rupture disc 22 and in turn the pressure force 13 is placed on the upper surface 30 of rotor 20. This pressure force 13 is then carried by first and second arms 29, 31 to first and second ears 33, 35 of rotor holder 18 which are best seen in FIG. 12. It may be desirable to measure or monitor this pressure force 13 because it is generally necessary in the airbag industry to have a means for measuring the pressure of the pressurized fluid 14 in the pressure vessel 12 so as to detect possible leakage over the life of an associated vehicle (not shown) and the pressure force 13 can be used, as is commonly known in the art, to determine this pressure. There are many places and means, chosen with sound engineering judgment, for measuring the pressure force 13. The two principal measuring means for use in this preferred embodiment are (1) measuring the deformation of the solid metal such as by bending, which could be measured with a strain gage; and (2) measuring the force transferred from the rotor to the ears by means of a force-sensing pad 80 placed between them. It should be noted that measuring the pressure of the pressurized fluid 14 may also involve measuring its temperature, since the pressure is temperature-dependent. The numbers of arms and ears could be greater than two but for practical purposes two is the minimum and probably most convenient so that is what is used in this preferred embodiment. Preferably, whenever a plurality of arms and ears are used their geometry will assure that upon actuation all of the arms fall off all of the ears at substantially the same angular position. Of course it may be desirable to arrange the arms and ears such that the arms fall off the ears one at a time i.e., at different angular positions. As explained above, rotor holder 18 is structurally connected to pressure vessel 12 and thus the force caused by the pressurized fluid 14 is fully supported. Rotor 20 also has a lower end 32 which operates like a piston and will be discussed further below. For this reason rotor 20 can be considered to be a piston.

Figure 6:
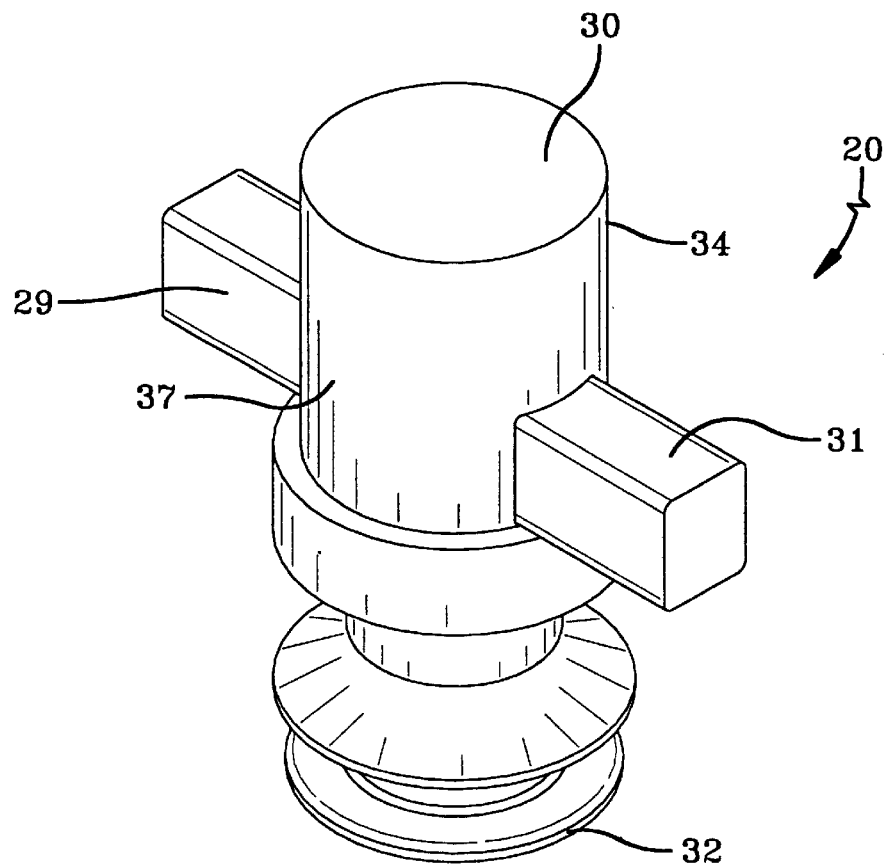
FIG. 6 is a perspective front view of the rotor used in this invention showing the upper surface which supports the rupture disc.
Figure 7:
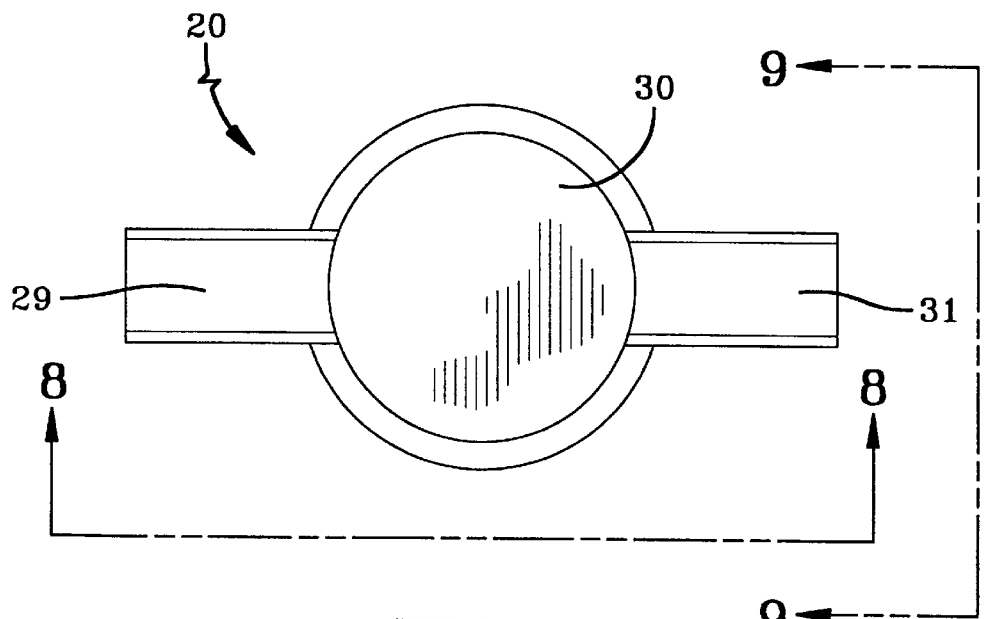
FIG. 7 is a top view of the rotor showing its first and second arms.

With reference to FIGS. 6 and 10–11, an important characteristic of first and second arms 29, 31 and first and second ears 33, 35 is that their surfaces, which are in contact with each other, preferably lie on a plane 38 which is perpendicular to the axis 40 of rotation of rotor 20 which also coincides with the principal axis of rotor support 18. It should be noted however, as discussed above, first and second arms 29, 31 may be positioned at angles not perpendicular to the axis of rotor 20. In that case, the surfaces of first and second arms 29, 31 may not lie on a plane perpendicular to the axis of rotor 20 and, in fact, may not lie on a plane at all. When they do lie on plane 38 the only force against which the protractor 42 must work is the friction due to the load on the rupture disk 22. Prior to the actuation of protractor 42, first and second arms 29, 31 will simply remain seated against first and second ears 33, 35. It can also be appreciated that rotor holder 18 can be machined fairly simply from cylindrical stock (not shown) by passing a milling cutter (not shown) having a T shape all the way across the piece. That would leave a continuous ear (not shown) across the piece from one side to the other on both sides of the cutter. As shown here the only portions of the continuous ear that remain are first and second ears 33, 35. The removal of the missing material could be accomplished by a standard milling cutter. It is not absolutely necessary to remove this material to shape the ears as shown, but if the missing material were to remain there might be a chance of that material interfering with the descent of rotor 20 which will be explained below.

Figure 13:
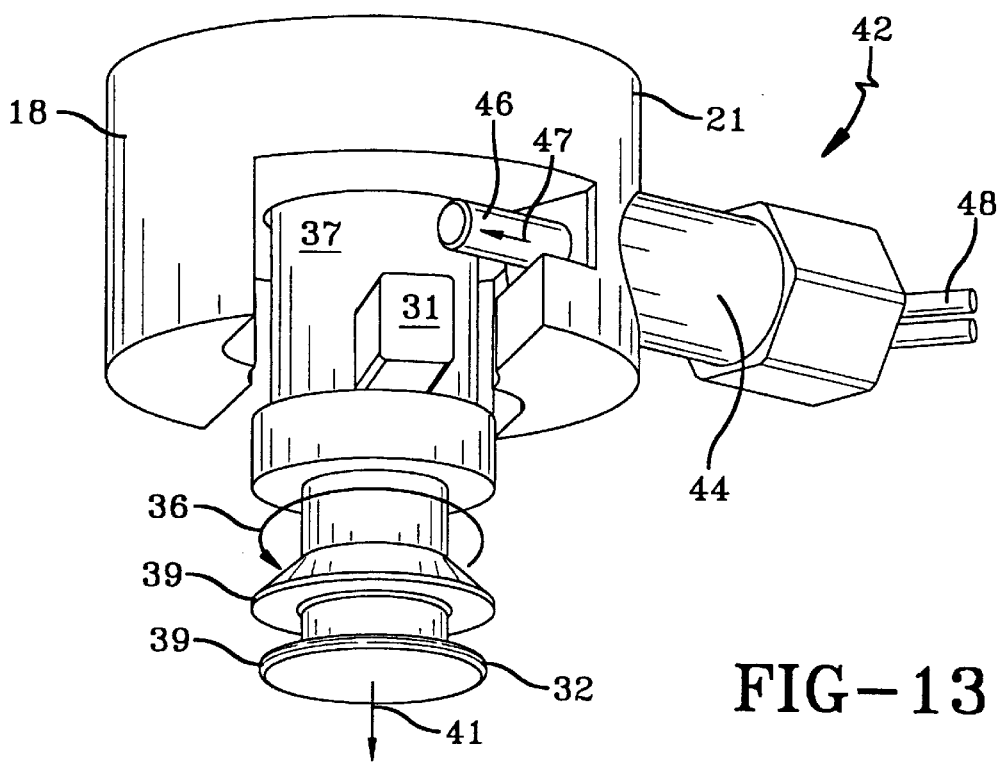
FIG. 13 is a perspective bottom-side view of the rotor and rotor holder of this invention showing the arms of the rotor no longer supported by the ears of the rotor holder and illustrating the direction of rotation of the rotor.

With reference now to FIGS. 1 and 12–13, selective actuation of release mechanism 10 is achieved by actuation means which is preferably a piston actuator such as protractor 42. Other actuation means such as electromagnetic or pneumatic devices are also possible. These other actuation means may be especially suited to applications other than for airbags. A piston actuator, also called a pressurized fluid motor or protractor, contains a small quantity of explosive material which is ignited by an electrical signal through a bridge wire (miniature resistive heater wire) in contact with the explosive material. The explosive material is enclosed within the body 44 of the protractor 42. The protractor 42 has electrical contact means 48 for receiving an electrical control signal which selectively ignites the explosive material. When the explosive material combusts, it generates a large pressure inside the body 44 of the protractor 42 which pushes piston 46 outward until it reaches a stop. This motion of piston 46 can be used for mechanical work such as pushing or puncturing objects. The products of combustion are contained inside the body 44 of the protractor 42 and have no escape path. This means that the protractor 42 releases nothing to the environment and is totally clean and self-contained. In order to maintain the contents of the protractor 42 after deployment to a range that can reasonably be contained inside the body 44, the amount of explosive in the protractor 42 and thus the mechanical work produced by the protractor 42 must be limited to fairly modest magnitudes. However, an advantage of such a device is that because of the retention of the combustion products inside the body 44 and because the amount of explosive that is present is small, frequently such a device can be classified for shipping and handling purposes as a non-explosive or non-pyrotechnic mechanism. This reduces the expense and the necessary precautions for shipping and handling. In addition, of course, there is no combustion product added to the pressurized fluid 14 exiting the release mechanism 10, making the release mechanism 10 totally clean and free of combustion products. Piston actuators are commercially available. The proper size and type of piston actuator is selected by sound engineering judgement depending on the use for the release mechanism 10. The preferred protractor 42 for this embodiment is available from ICI Nobel's Explosives of Ayrshire, Scotland. Though preferred, it is not essential that a self-contained protractor 42 be used in this invention. A piston actuator, such as protractor 42, does have expense, complexity and extra parts associated with keeping the combustion products contained inside its body 44. Similar explosive devices are also commercially available in which the explosion is not contained or confined. Such non-contained devices are often referred to as squibs. If a mechanical object is positioned close to the point of explosion of a squib, significant force will still be exerted on the object during the brief period in which the explosion takes place, even though the explosion is non-contained. The combustion products from the explosion would then mix with the pressurized fluid 14 stored inside pressure vessel 12 as it exits. Accordingly, it would be possible to have a similar design in which an non-contained explosive device is pointed at an arm, such as second arm 31, causing it to move upon explosion. This type of design would save some amount of cost and complexity represented by certain internal parts of the piston actuator such as piston, cylinder, and O-ring. Dimensionally, it would be shorter than protractor 42 which would also provide more design freedom in positioning the device along the axial direction of the release mechanism 10, thereby resulting in a slight shortening of the overall length.

Figure 20:
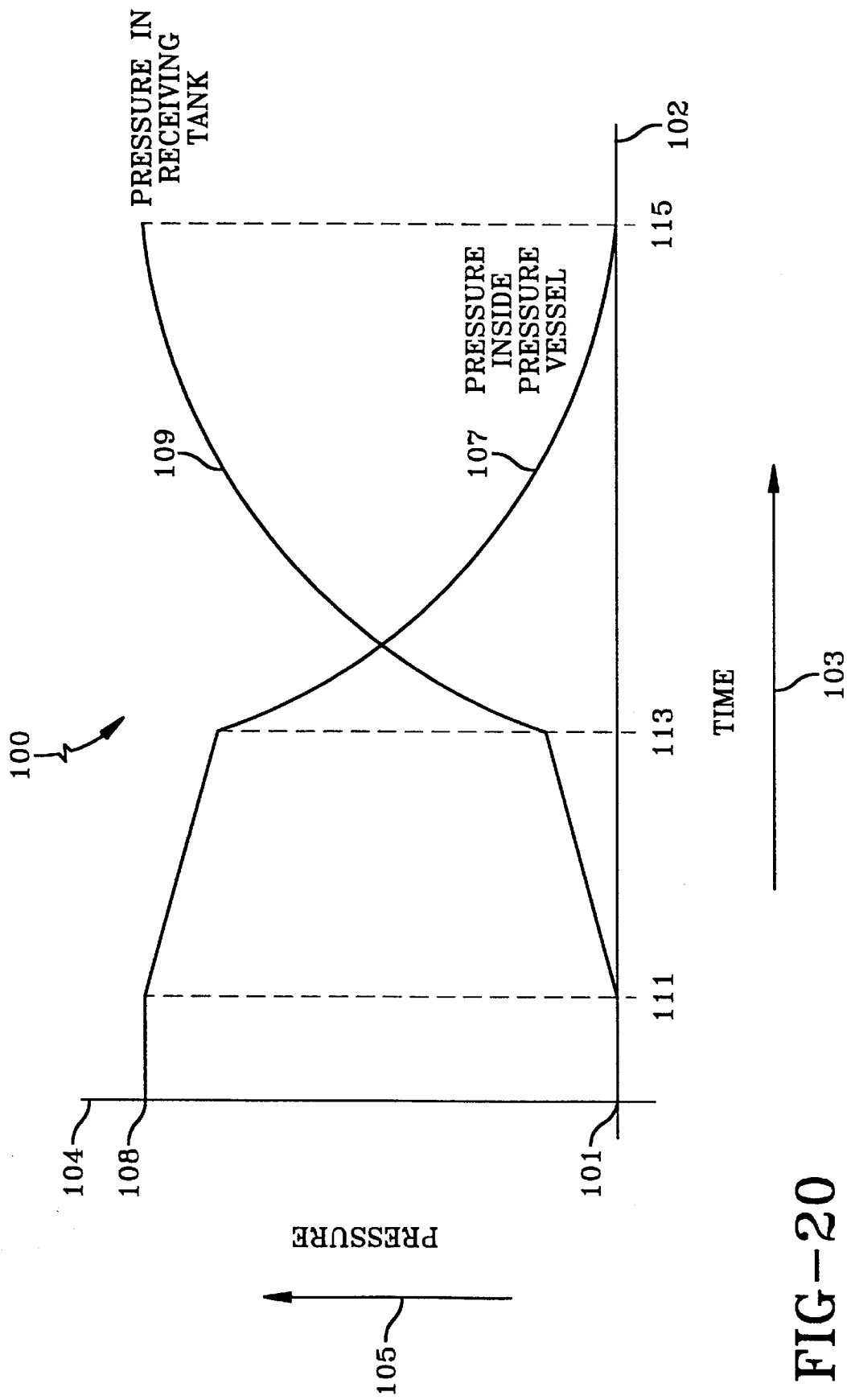
FIG. 20 is a Pressure/Time graph showing how the pressure of the pressurized fluid inside the pressure vessel changes over time and showing directionally how the pressure inside a receiving tank changes over time.
Figure 23:
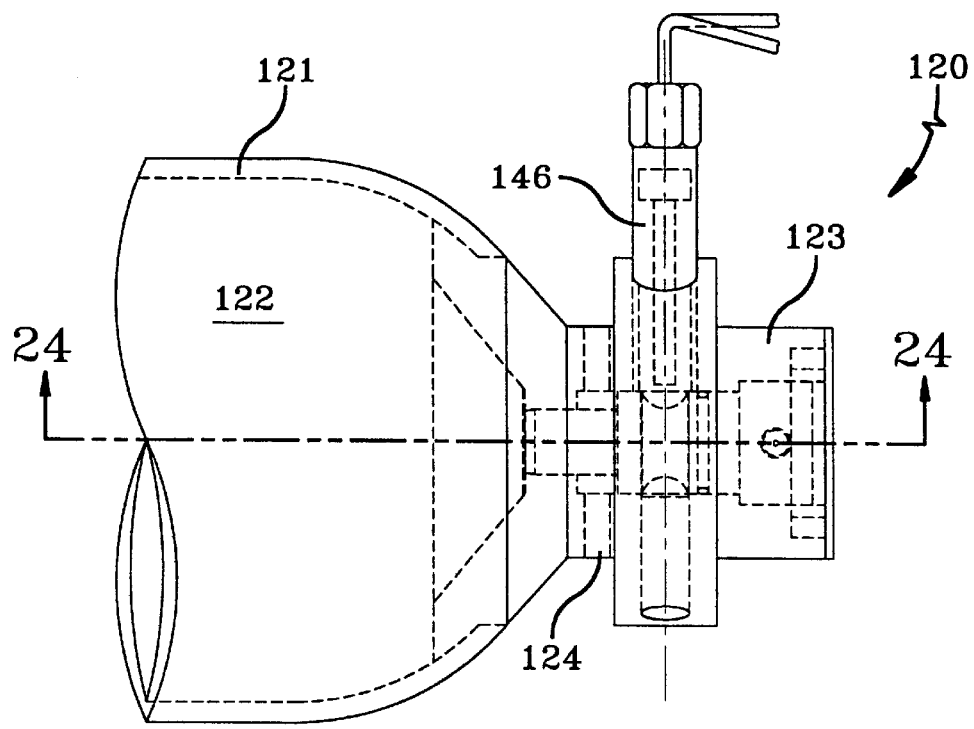
FIG. 23 is a side view of an alternate release mechanism embodiment taken along the line 23—23 of FIG. 25.
Figure 24:
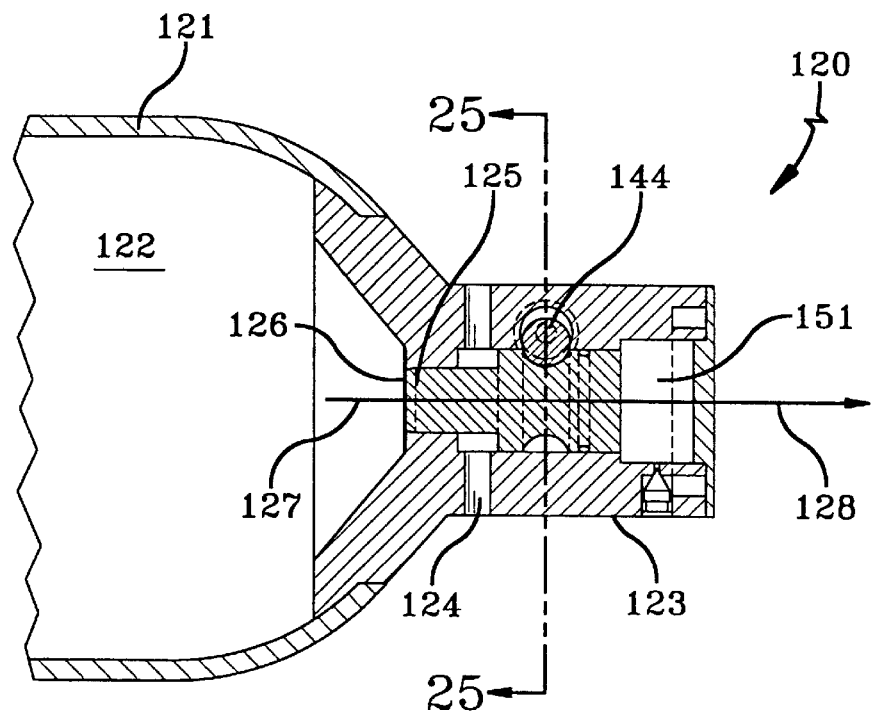
FIG. 24 is a cutaway side view taken along the line 24—24 of FIG. 23 showing the support member supporting the rupture disc.
Figure 25:
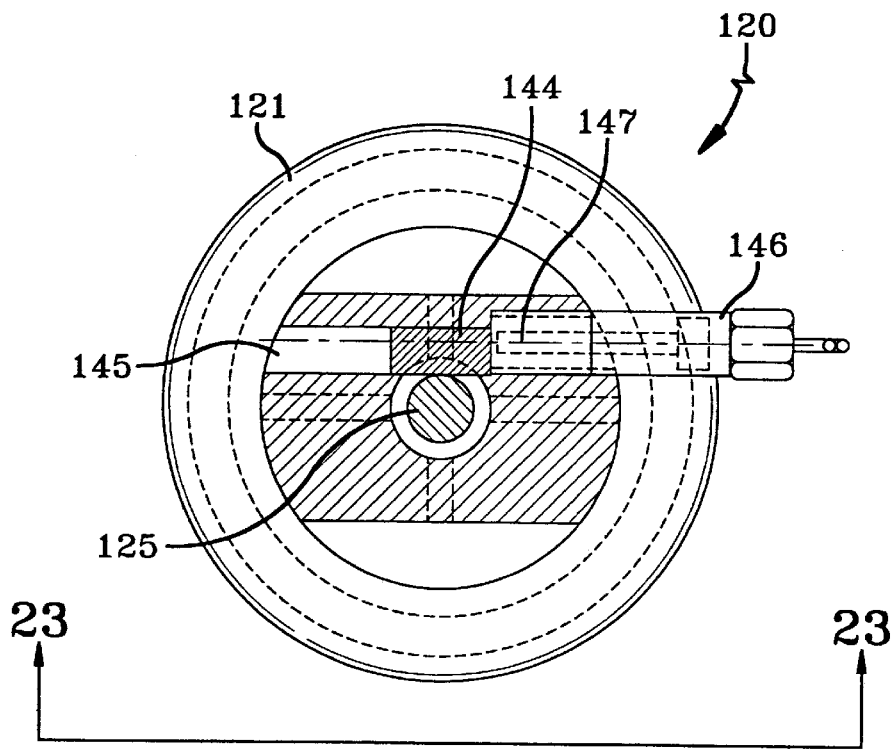
FIG. 25 is a cutaway bottom view taken along the line 25—25 of FIG. 24 showing the protractor before its piston has been extended.
Figure 26:
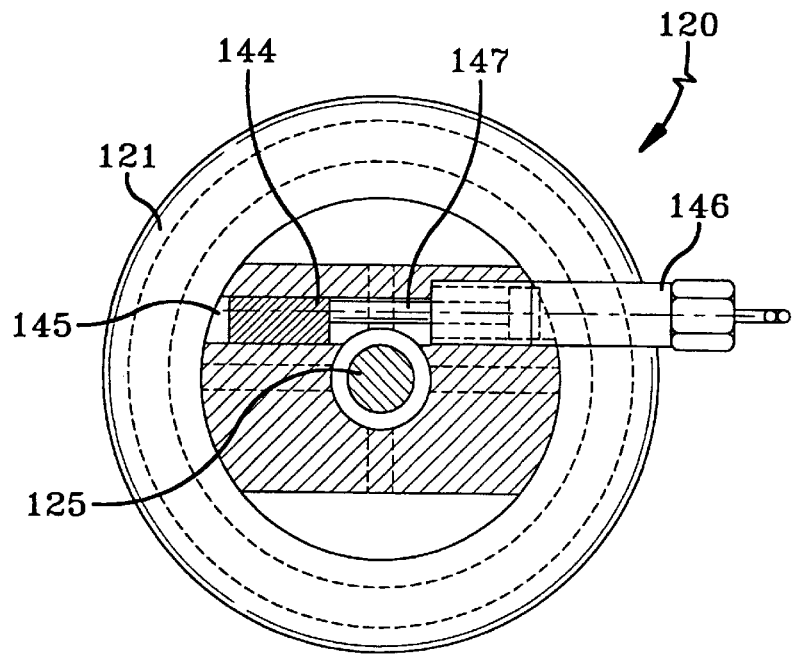
FIG. 26 is a cutaway bottom view showing the protractor after its piston has been extended.

With reference to FIGS. 1 and 20, each of the five stages will be discussed with reference to Pressure/Time graph 100 which has a time axis 102 where the time value begins at zero at point 101 and increases in direction 103 and a pressure axis 104 where the pressure value begins at zero at point 101 and increases in direction 105. Curve 107 shows directionally how the pressure of pressurized fluid 14 inside pressure vessel 12 changes over time and curve 109 shows directionally how the pressure inside a closed receiving tank (not shown but used to receive pressurized fluid 14 in testing the release mechanism 10) changes over time. It should be noted that the scales of pressure for the curves 107, 109 are different. Typically, the receiving tank (not shown) is much bigger than the pressure vessel 12. Thus, the scale of pressure in the receiving tank (not shown) is much smaller. In one experimental case, for example, the final pressure value in the receiving tank was 45 pounds per square inch gauge (PSIG) and the initial pressure value in the pressure vessel 12 was 6000 PSIG. In that case, the scales of pressure differed by a factor of slightly more than 100. Therefore, Pressure/Time graph 100 is directionally accurate and illustrates well the operation of release mechanism 10 but it does not reflect a common pressure scale. Curves 107, 109 illustrate the damping occurring with release mechanism 10. The first stage, the support stage, occurs between points 101, 111 along the time axis 102. Note that the pressure inside pressure vessel 12 remains at its maximum value, shown at point 108, while the pressure in the receiving tank (not shown) remains at its minimum value, zero, during this first stage. The time interval between points 101, 111 is essentially only the time required for the protractor 42 to actuate, which for airbag applications must be at most several milliseconds.

Stage 2—The Removal of Support Stage

With reference now to FIGS. 1–2, 6–13 and 18, when it is desired to release the pressurized fluid 14 from the pressure vessel 12, rotor 20 must be removed from its supporting relation with rupture disc 22. To initiate this action, an electric signal is selectively sent through electrical contact means 48 which causes the explosive material within body 44 of protractor 42 to ignite. This ignition extends piston 46 which pushes on first arm 31 of the rotor 20 in direction 47 which is approximately perpendicular to the principal direction of first arm 31 so as to cause rotation of rotor 20 around axis 40 in direction 36. The dimensions of first and second arms 29, 31 and first and second ears 33, 35 are such that rotation of rotor 20 through a predetermined angular rotation, that is preferably in the range of 10° to 30°, is sufficient to move first and second arms 29, 31 out of first and second ears 33, 35 thus causing first and second arms 29, 31 to become completely unsupported. Other dimensions and angular rotations chosen with sound engineering judgement are also possible. The rotor 20 has an upper end 34 having an exterior cylindrical surface 37 which is located, at this stage, inside first cylindrical bore 26. Similarly the exterior cylindrical surface 39 of the lower end 32 of rotor 20 is located inside first cylindrical bore 52 of damper body 50. Both of these cylinder-to-bore interfaces provide a guidance and restraining action which approximate a journal bearing as rotor 20 is rotated. As soon as rotor 20 has rotated through a sufficient angle, first and second arms 29, 31 no longer rest on first and second ears 33, 35 of rotor holder 18. This leaves rotor 20 no longer supported and the pressure of pressurized fluid 14, acting through the relatively weak rupture disc 22, will cause the rupture disc 22 to rupture and will subsequently cause rotor 20 to move in a downward direction 41.

With reference to FIGS. 1–2 and 20, the second stage, the removal of support stage, occurs instantaneously at point 111 on the time axis 102. Thus, at the moment the rotor 20 is removed from supporting rupture disc 22, the pressure inside pressure vessel 12 remains at its maximum value, shown at point 108, while the pressure in the receiving tank (not shown) remains at its minimum value, zero.

Stage 3—The Free Descent Stage

With reference now to FIGS. 1–2, 6–13 and 18, when first and second arms 29, 31 fall off of first and second ears 33, 35, it is helpful to have a relatively small distance (typically about 0.030 inches [0.75 mm]) of free drop or free descent for the rotor 20 in which little or no damping is exerted on it. This ensures that rupture disc 22 ruptures cleanly and as soon as support has been lost. As lower end 32 of rotor 20 descends, it combines with first cylindrical bore 52 of damper body 50 to form a piston-cylinder combination. The free descent can be accomplished by providing a compressible material of known volume in the damping substance 53 within holding region 54, provided that the damping substance 53 is a liquid, i.e. nearly incompressible. The compressible material is preferably a bubble of air 56 sized according to the desired time interval for the free descent stage. Other compressible materials, chosen with sound engineering judgment could also be used. The bubble of air 56 is extremely compressible compared to the damping substance 53, and given the large storage pressures anticipated within pressure vessel 12, whenever rotor 20 is forced in downward direction 41 the bubble of air 56 will compress to essentially zero volume and provide essentially a free descent for rotor 20 until then.

Figure 14:
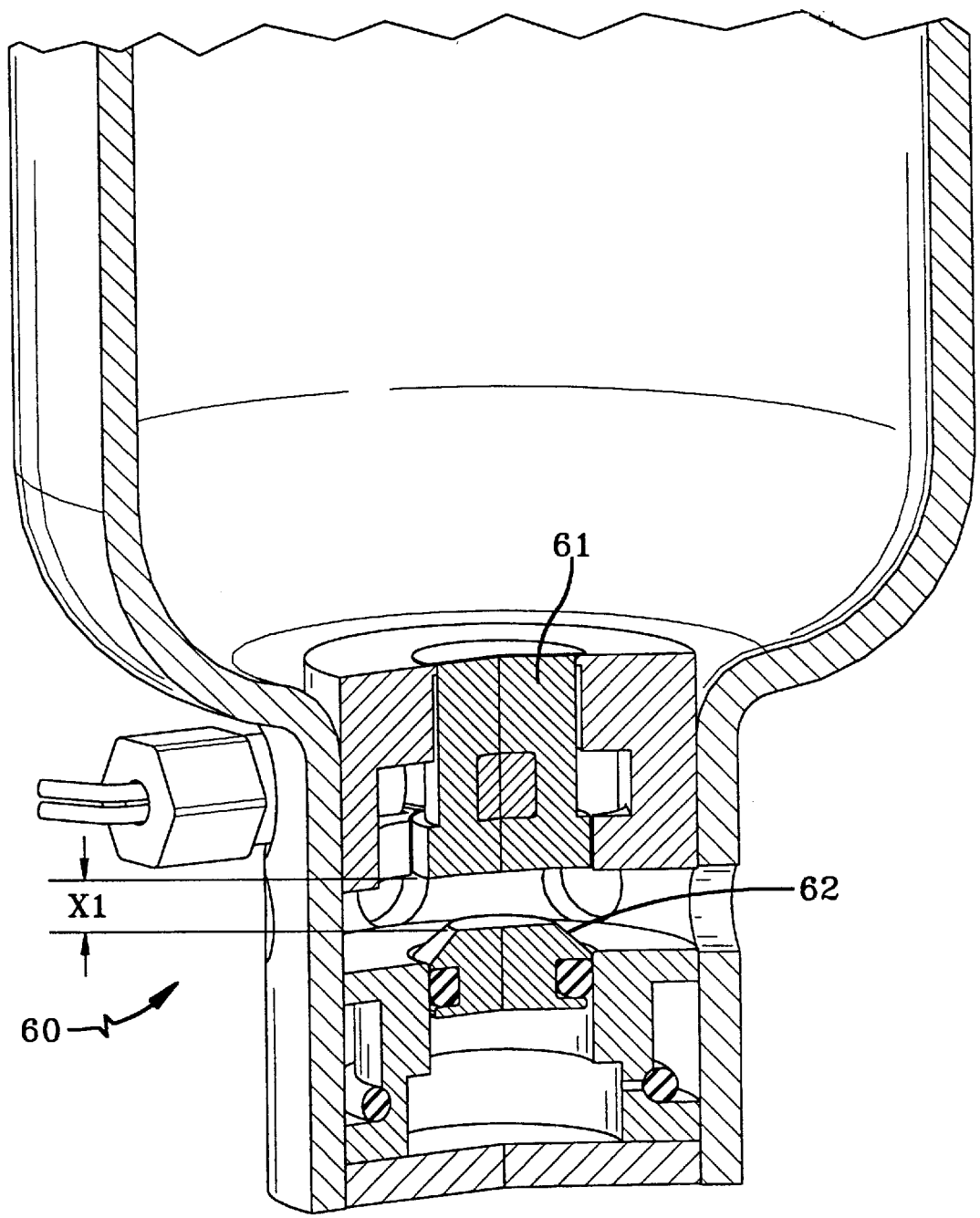
FIG. 14 is a cutaway side view of an alternate release mechanism embodiment illustrating the gap between the rotor and the piston.

With reference to FIGS. 1–2 and 6–14, an alternate way of providing the free descent is to replace the current rotor 20 with two parts having a gap between them. This is shown in FIG. 14 which shows release mechanism 60 which is also a spin-and-drop embodiment and includes rotor 61 and piston 62 which are separated by a distance X1. In this embodiment the rotor 61 would have to fall, in a literal free fall, a distance X1 before contacting piston 62 and initiating damping. In the preferred embodiment shown in FIGS. 1–2, however, to simplify and minimize the number of parts, rotor 20, a single part, has a lower end 32 which operates like a piston. This piston action will be discussed below.

Figure 15:
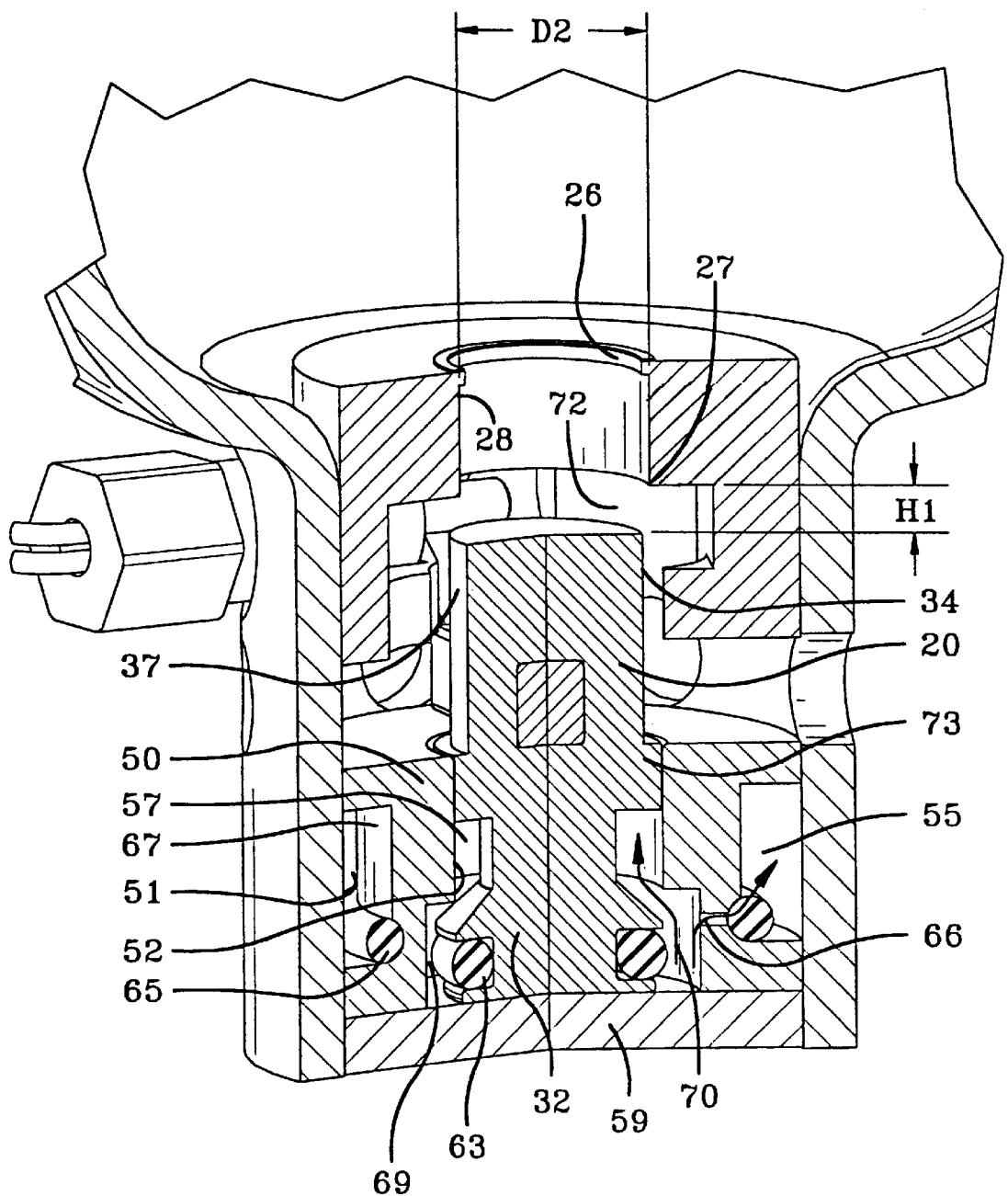
FIG. 15 is an enlarged cutaway side view showing the release mechanism in the midst of the lightly damped descent stage illustrating the distance between the upper end of the rotor and the bottom of the second cylindrical bore.
Figure 16:
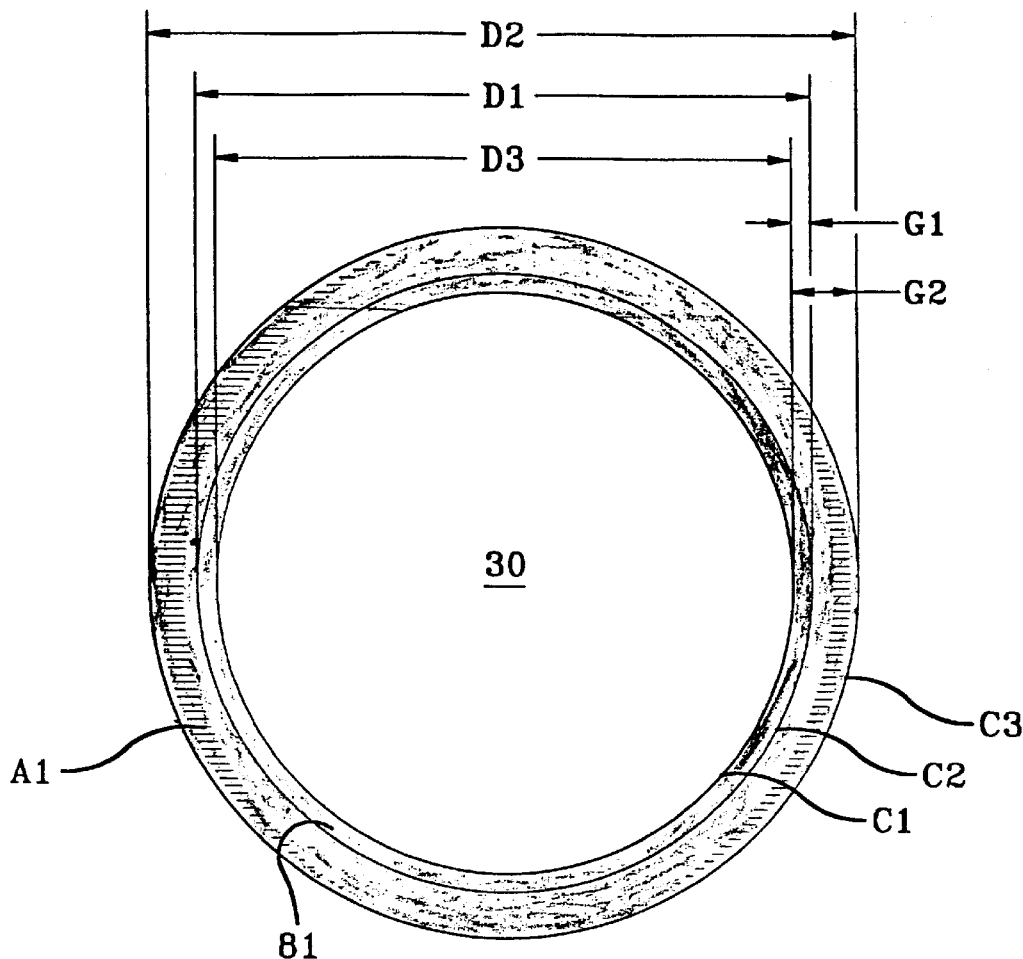
FIG. 16 is a simplified top view that illustrates the first area of exit flow area available for pressurized fluid during the highly damped descent stage.

With reference now to FIGS. 1–2, 6, 8, 15–16 and 18, during the time of free descent, an annular first gap G1, seen in FIG. 18, exists between the exterior cylindrical surface 37 of upper end 34 of rotor 20 (which has a diameter D3) and the first cylindrical bore 26 of rotor holder 18 (which has a diameter D1). To help visualize first annular gap G1, FIG. 16 shows a simplified top view that illustrates upper surface 30 of rotor 20 which has first circle C1 as an outer edge, first cylindrical bore 26 which has second circle C2 as an outer edge, and second cylindrical bore 28 which has third circle C3 as an outer edge. Annular first gap G1 is the smallest gap between exterior cylindrical surface 37 and any bore of rotor holder 18. This closeness of rotor 20 to rotor holder 18 helps to minimize the unsupported area of rupture disc 22 during conditions of pressurized fluid 14 storage. During the time of free descent, pressurized fluid 14 would be exposed to the area within second circle C2 including the area of first circle C1. Since rotor 20 is now unsupported, it would complete its free descent very quickly.

With reference to FIGS. 1–2 and 20, the third stage, the free descent stage, occurs almost instantaneously when the rotor is removed from supporting rupture disc 22. Thus the third stage, like the second stage, is shown as occurring at point 111 on the time axis 102. For practical purposes, it is after the free descent stage that the pressure inside pressure vessel 12 and the pressure in the receiving tank (not shown) change from their initial values, maximum and zero respectively.

Stage 4—The Highly Damped Descent Stage

With reference now to FIGS. 2–4, for applications such as automotive airbag inflators, the storage pressures of the pressurized fluid 14 (typically several thousand pounds per square inch), are such that the unsupported rotor 20 would move in downward direction 41 the full extent of its travel in well under one millisecond if there were no damping control mechanism. While it is desirable to have pressurized fluid 14 begin to flow as quickly as possible after the deployment signal, it is not desirable to have the exit flow area open fully in a fraction of a millisecond. Instead, the output flow rate of the pressurized fluid 14 must be pulse-shaped in order to provide a controlled unfolding of the associated airbag (not shown) and to lessen the impact of the airbag on a passenger who might possibly be seated too close to the inflator. It is desired to have a more gentle flow rate, which occurs during the highly damped stage, for the first ten milliseconds or so and then a more rapid flow rate, which occurs during the lightly damped stage, for the rest of the time of airbag inflation. The value 10 milliseconds is typical of passenger side airbag inflators. This can be done by damping control means which in this preferred embodiment is achieved by mechanically controlling the rate of descent of rotor 20 and thereby also controlling the exit flow area for the pressurized fluid 14. This will now be described.

With reference to FIGS. 2–4, 15–16 and 18, when rotor 20 completes its free descent in the downward direction 41, the highly damped stage begins, as shown in FIG. 2, when lower end 32 begins to push damping substance 53 out of holding region 54 through first bleed hole 58. Meanwhile, as seen in FIG. 3, pressurized fluid 14 begins to flow out of pressure vessel 12 at a first flow rate R1. First flow rate R1 is relatively gentle because pressurized fluid 14 can only flow through first area A1 which is the exit flow area available for pressurized fluid 14 during the highly damped descent of rotor 20. As best seen in FIGS. 16, 18, second annular gap G2 helps to define first area A1 (the shaded annular portion in FIG. 16) and is larger than first annular gap G1. As mentioned above, third circle C3 represents the outer edge of second cylindrical bore 28. Second annular gap G2 also helps to insure that the edges of the now ruptured rupture disc 22 (shown in FIG. 1) do not form a wiper seal against first cylindrical bore 26.

With reference now to FIGS. 3–4 and 15, when the damping substance 53 is pushed out through first bleed hole 58, it enters first collecting region 55. The purpose of first collecting region 55 is simply to retain damping substance 53 and prevent it from escaping, thereby for example, avoiding contamination of the exiting pressurized fluid 14 by entrainment of damping substance 53. First collecting region 55 is bordered by a groove 51 in the outer surface 67 of damper body 50 together with the interior surface 15 of skirt 16. During the highly damped descent stage then, first damping substance flowpath 66 is the flowpath of the damping substance 53 from holding region 54 through first bleed hole 58 and into first collecting region 55.

With reference to FIGS. 2–4, 6 and 10–11, the area of surface 64 which is the bottom surface of lower end 32 is substantially the same as the area of upper surface 30 which is the surface of rotor 20 used to support rupture disc 22. For this reason the peak pressure in the damping substance 53 within holding region 54 will be approximately the same as the peak pressure of pressurized fluid 14. These two areas, of surface 64 and upper surface 30, may be varied with sound engineering judgement realizing that the pressure exerted on the damping substance 53 varies approximately by the ratio of the two areas as is commonly known in the art.

With reference now to FIGS. 3–5, 8–9 and 15, during all the five primary stages used in the deployment of release mechanism 10, it is necessary to prevent leakage of the damping substance 53 into the exiting pressurized fluid 14. For this reason sealing means such as slidable sealing O-ring 63 is provided to seal off holding region 54 from the holes 17 in the skirt 16 of the pressure vessel 12 during the first 4 primary stages. The sealing means for the fifth primary stage will be discussed below. Slidable sealing O-ring 63 is positioned in groove 68 which is located in the lower end 32 of rotor 20. Other methods for sealing means chosen with sound engineering judgement, such as a wiper seal are also possible. Fluid retention O-ring 65 is positioned in groove 51 on the outer surface 67 of damper body 50. Fluid retention O-ring 65 serves as a sealing means to cover first bleed hole 58 prior to the release of pressurized fluid 14 so that the damping substance 53 stays inside holding region 54. During the release of pressurized fluid 14, however, rotor 20 will transmit relatively high pressure to damping substance 53. Such relatively high pressure will cause fluid retention O-ring 65 to be easily moved out of the way, allowing damping substance 53 to exit through first bleed hole 58. There are also other sealing means chosen with sound engineering judgement that could take the place of fluid retention O-ring 65.

Figure 17:
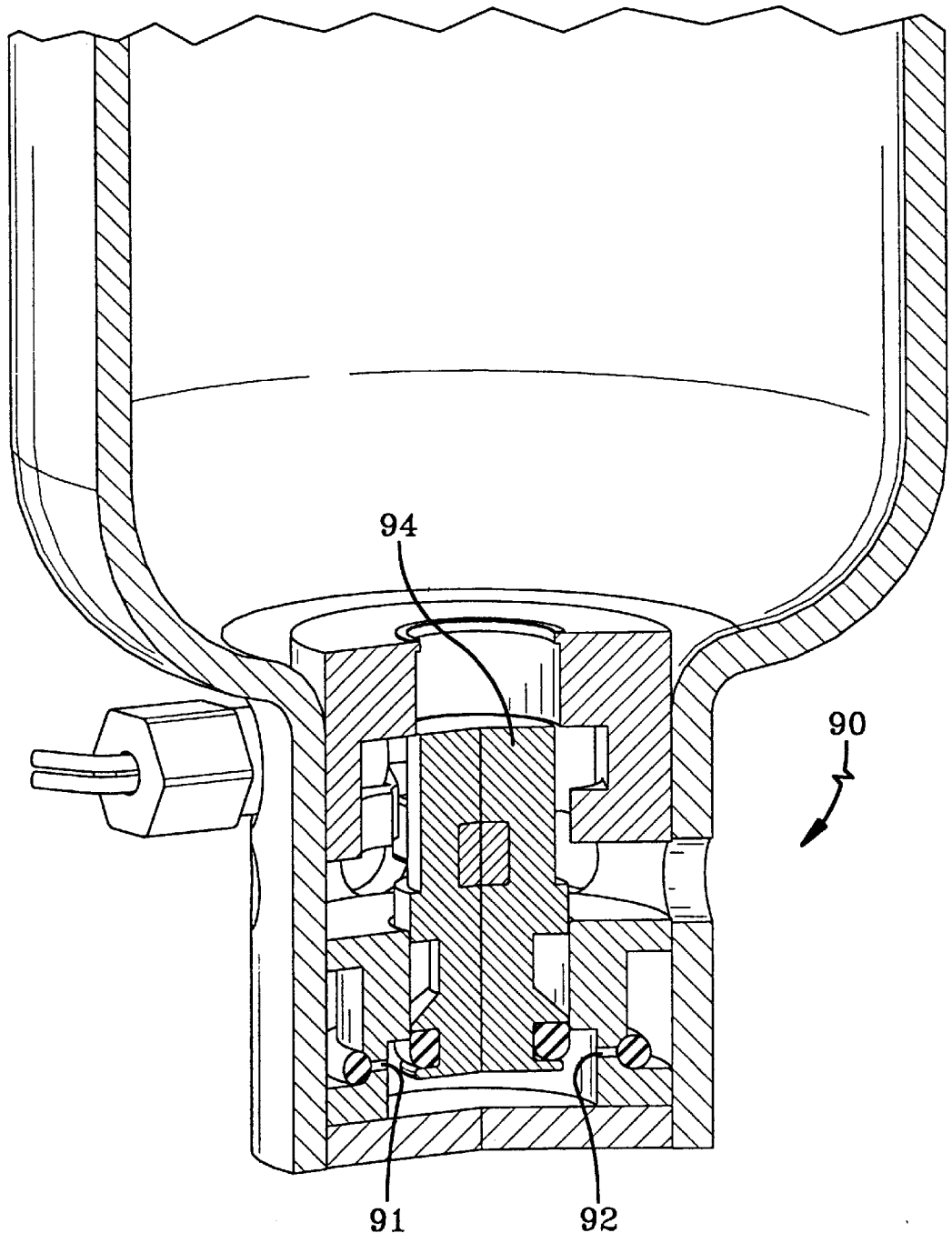
FIG. 17 is a cutaway side view of an alternate release mechanism embodiment showing first and second bleed holes.

With reference to FIGS. 3–4 and 17, a recent trend within the airbag industry is toward the use of intelligent occupant restraint systems which will continuously sense variables such as the weight of the occupant, the position of the occupant, the speed of a crash, and the presence and position of an infant car seat, and will adjust the airbag characteristics accordingly. Thus, it should be appreciated that the damping characteristics of rotor 20, and therefore the regulating characteristics of the release of pressurized fluid 14, are significantly affected by the flow area and orientation of first bleed hole 58. In this embodiment bleed hole 58 is radially oriented but it should be noted that the orientation can be varied using sound engineering judgement. Since first bleed hole 58 is outside the pressure boundary of the stored pressurized fluid 14, it is very accessible for adjustment. If the flow area of first bleed hole 58 is relatively large (typically a bleed hole will have a diameter of about 0.020 inches [0.5 mm]), the duration of the gentle flow rate of pressurized fluid 14, which in this embodiment is first flow rate R1, will be relatively brief. If, on the other hand, the flow area of first bleed hole 58 is smaller, the duration of first flow rate R1 will be relatively longer. Accordingly, by using adjusting means to adjust the flow area of first bleed hole 58, the damping characteristics of release mechanism 10 can be varied. Alternatively, as shown in FIG. 17, a release mechanism 90 can have first and second bleed holes 91, 92 to adjust the damping characteristics. In this embodiment when the most rapid descent of rotor 94 is desired, first and second bleed holes 91, 92 are selectively opened in combination. If less rapid descent is desired, only one bleed hole, for example first bleed hole 91, is selectively opened. Thus release mechanism 90 provides a step-wise adjustability of the damping. Of course any number of bleed holes chosen with sound engineering judgement could be used for damping control. The devices used for adjusting means could be of any type currently known in the art such as stepper motors, solenoids, metering pins or needle valves. All such devices can be used to provide a means of intelligently adjusting the damping characteristics.

Figure 8:
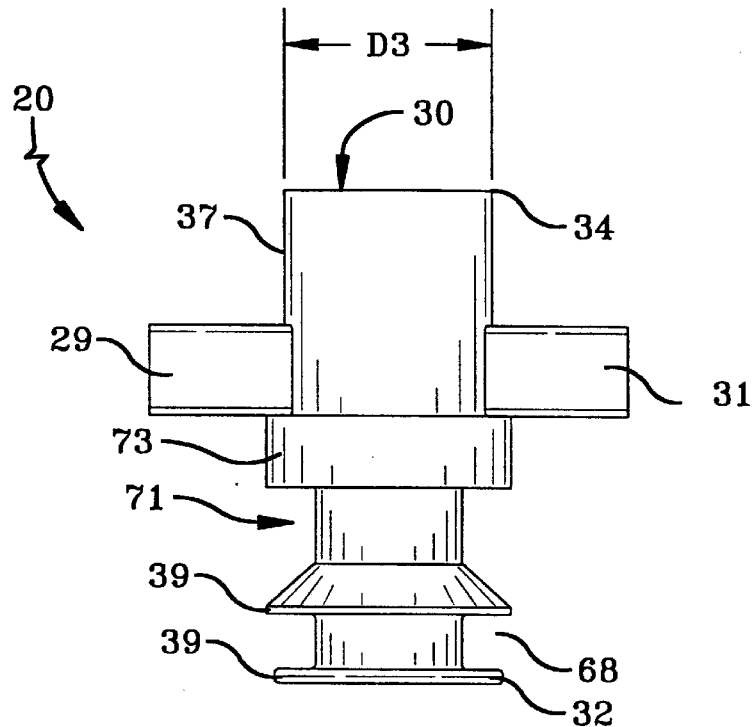
FIG. 8 is a front view of the rotor taken along the line 8—8 of FIG. 7 showing the recess used to form a boundary of the second collecting region.
Figure 9:
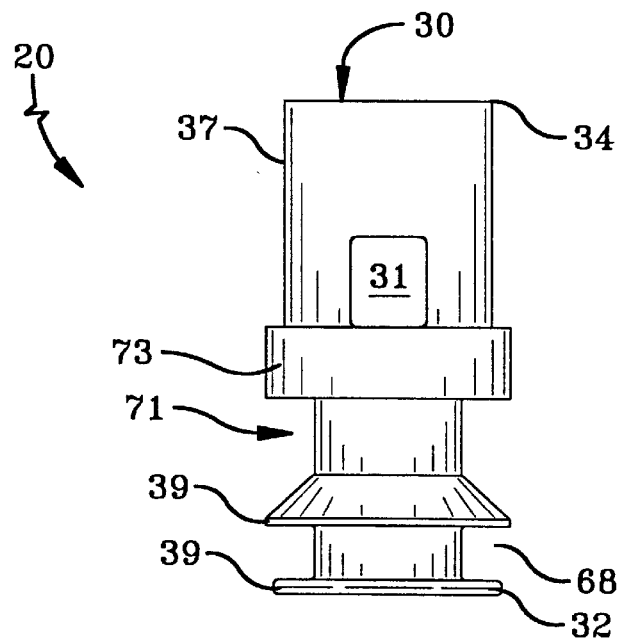
FIG. 9 is a side view of the rotor taken along the line 9—9 of FIG. 7 showing the groove used to hold the slidable sealing O-ring.

With reference to FIGS. 3–4, 8, it should be noted that if damping (controlled descent of rotor 20) is not needed, then the lower end 32 of rotor 20 as well as damper body 50 can be deleted. Rotor 20 would just be a support member and could essentially end just below first and second arms 29, 31. Such a release mechanism is the subject of a commonly owned and copending patent application Ser. No. 08/808,819.

With reference to FIGS. 2–4, 20, the fourth stage, the highly damped descent stage, occurs between points 111, 113 along the time axis 102. Note that the pressure inside pressure vessel 12 gradually decreases while the pressure in the receiving tank (not shown) gradually increases during this stage. These relatively gradual changes in pressure demonstrate that the pressurized fluid 14 is being released at a relatively slower flow rate thereby achieving the gentle early portion of a pulse-shaped discharge.

Figure 34:
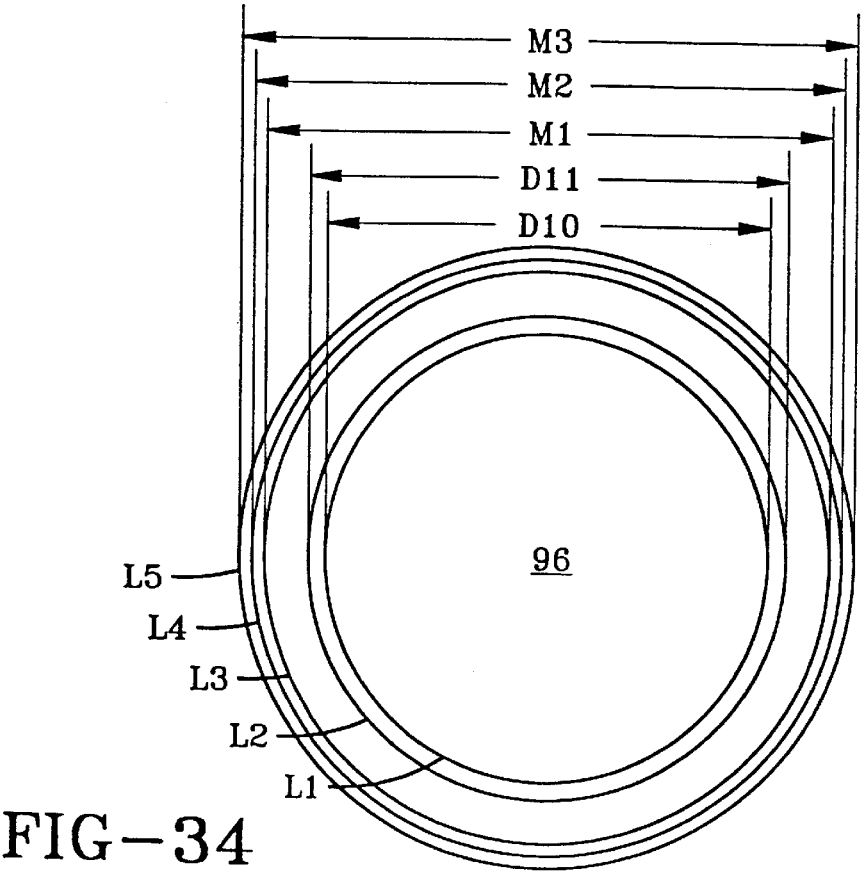
FIG. 34 is a simplified top view that illustrates the diameter of the upper surface of the rotor, the diameter of the first cylindrical bore and the diameters of the variable bore at its top, mid-section and bottom.
Figure 35:
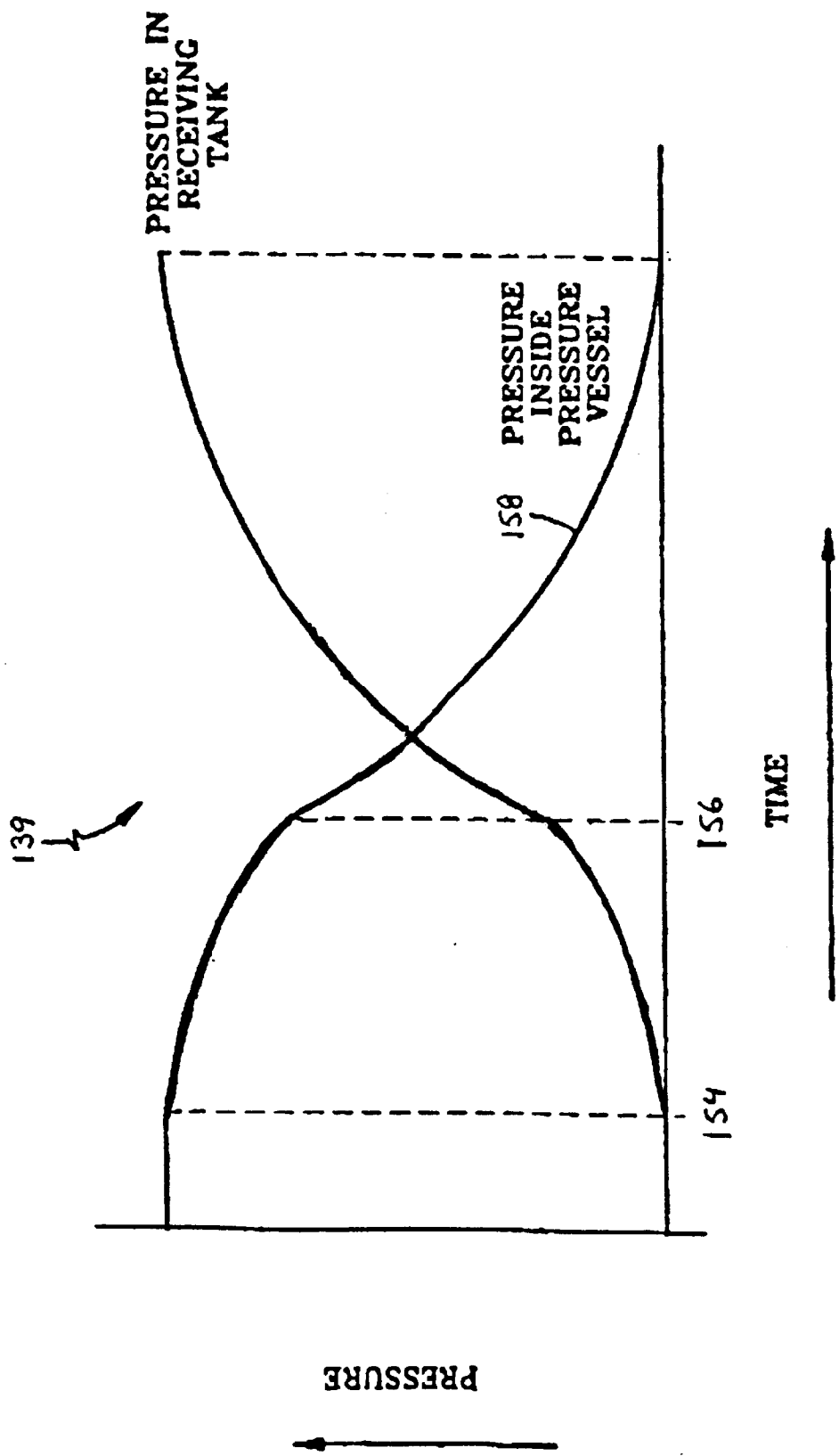
FIG. 35 is a Pressure/Time graph showing how the pressure of the pressurized fluid inside the pressure vessel changes over time when a variable bore is used.

In another embodiment, with reference to FIGS. 29–35, release mechanism 134 which includes rotor 95 and rotor holder 98 provides more variation during the highly damped descent stage by replacing the second cylindrical bore 28 (shown in FIGS. 1, 18 and 21–22) of previous embodiments with variable bore 135. With this arrangement second annular gap G2 (shown in FIGS. 18 and 21–22) is replaced with variable gap G3 which is the radial distance between variable bore 135 and the top 118 of rotor 95. Rotor 95 has a diameter D10. Preferably variable bore 135 has a slightly tapered cone-shape and increases in diameter in downward direction 99. Thus, at the top 136 of variable bore 135 diameter M1 provides an exit flow area E1 (the shaded area shown in FIG. 31) between the top 118 of rotor 95 and rotor holder 98 for the pressurized fluid 97 to escape pressure vessel 119. As the rotor 95 descends in downward direction 99, variable gap G3 continues to increase as does the varying exit flow area. At mid-section 137 diameter M2 provides an exit flow area E2 (the shaded area shown in FIG. 32) which is larger than E1. As the rotor 95 descends to the bottom 138 of variable bore 135, variable gap G3 increases still further as does the varying exit flow area. Diameter M3 provides an exit flow area E3 (the shaded area shown in FIG. 33) which is larger than both E1 and E2. To help visualize the variation in diameter, FIG. 34 is a simplified top view that illustrates the following: upper surface 96 of rotor 95 which has first circle L1 as an outer edge and a diameter D10, first cylindrical bore 117 which has second circle L2 as an outer edge and a diameter D11, the top 136 of variable bore 135 which has a third circle L3 as an outer edge and diameter M1, the mid-section 137 of variable bore 135 which has a fourth circle L4 as an outer edge and diameter M2 and, the bottom 138 of variable bore 135 which has a fifth circle L5 as an outer edge and diameter M3. The use of variable bore 135 means that the pressurized fluid 97 flows out of pressure vessel 119 through an opened varying exit flow area at a variable flow rate R3 during this stage. The associated pressure verses time relationship is shown in Pressure/Time graph 139 which is similar in scale values to Pressure/Time graph 100. The highly damped descent stage occurs between points 154 and 156. Note that now the pressure inside pressure vessel 119, shown by curve 158 decreases in a non-linear fashion for this stage. Of course other variable bore designs chosen with sound engineering judgment could also be used for this invention.

Stage 5—The Lightly Damped Descent Stage

Figure 5:
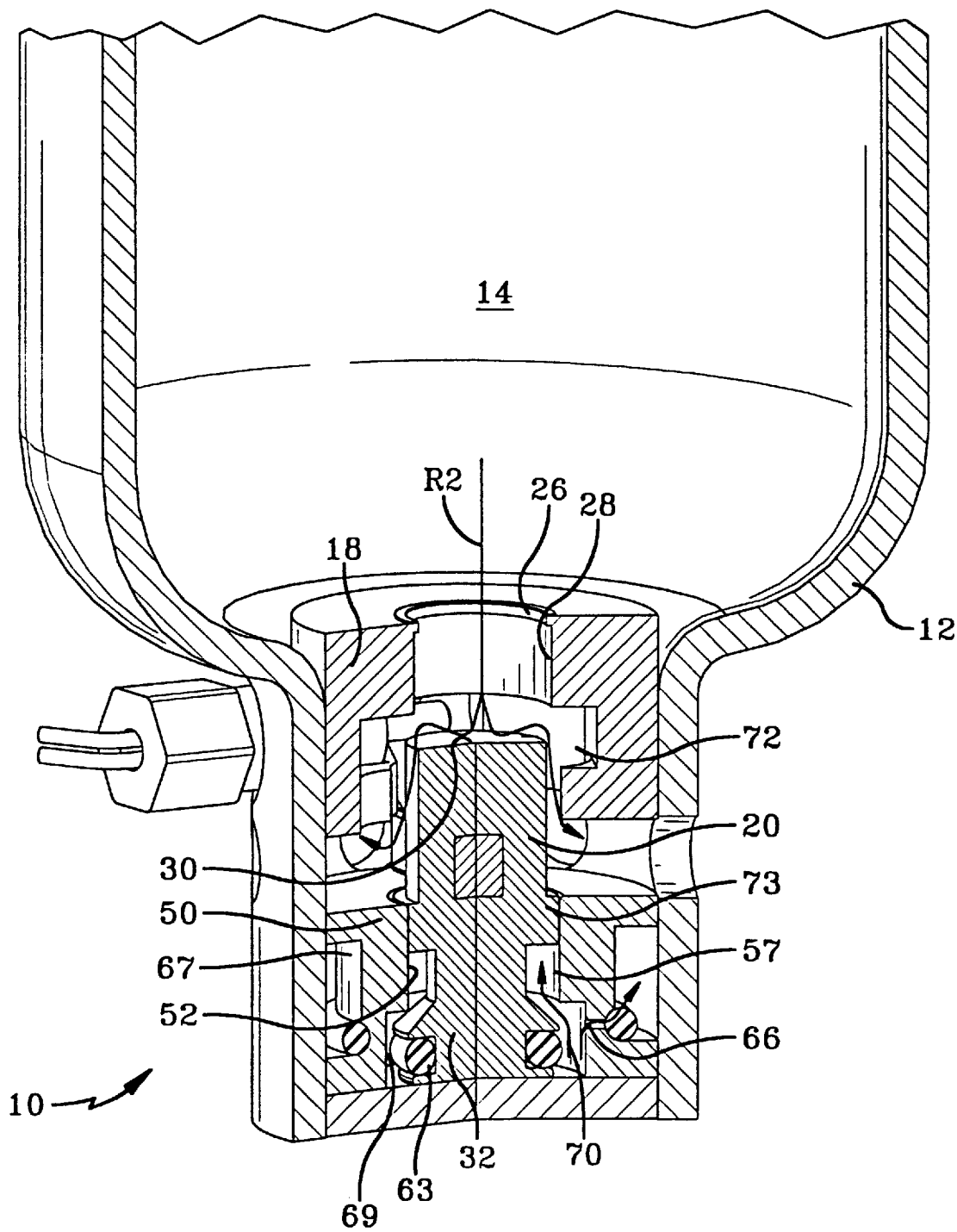
FIG. 5 is a cutaway side view showing the release mechanism in the midst of the lightly damped descent stage illustrating the second flow rate of pressurized fluid out of the release mechanism, the first damping substance flowpath and, the damping substance passageway.
Figure 19:
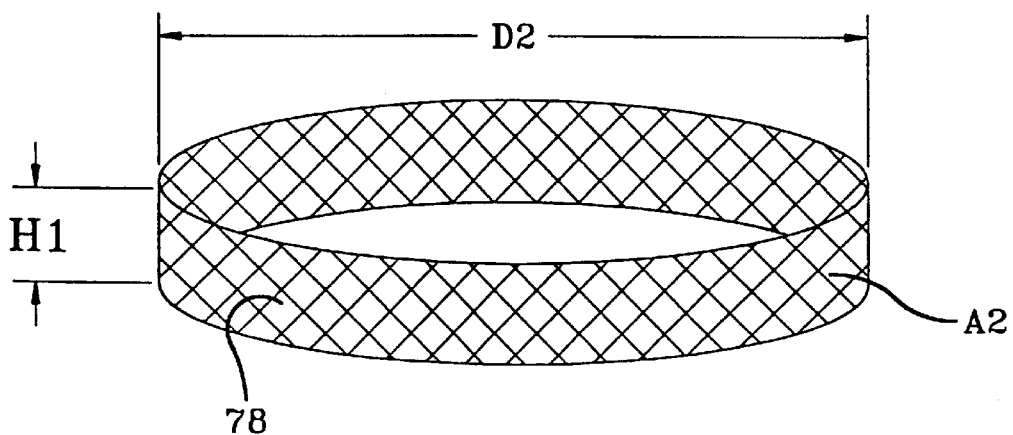

With reference now to FIGS. 4–6, 12, 15, 19, after a certain time of highly damped descent when the pressurized fluid 14 exits at a first flow rate R1 (shown in FIG. 3), it is desirable that the exit flow area open to a second area A2 which is larger than first area A1 to let the rest of the pressurized fluid 14 exit at second flow rate R2 which is much more rapid. To accomplish this it is necessary to significantly reduce the damping on rotor 20. Otherwise, rotor 20 might never get pushed down as far as necessary or this would only happen very late in the transient. The reduction in damping is achieved in this embodiment by the opening of damping substance passageway 70. This is accomplished when slidable sealing O-ring 63 descends to the position where it loses contact with the first cylindrical bore 52 and enters second cylindrical bore 69 of damper body 50. Second cylindrical bore 69 has a larger diameter, in this preferred embodiment, than first cylindrical bore 52, which permits damping substance 53 to flow around the lower end 32 of rotor 20 and enter second collecting region 57. FIG. 4 shows slidable sealing O-ring 63 just prior to its losing contact with first cylindrical bore 52 while FIG. 5 shows it after it has lost contact. During this lightly damped descent stage slidable sealing O-ring 63 does not function as a seal. Instead, the sealing of the damping substance 53 is accomplished by the close clearance between ridge 73 and the first cylindrical bore 52 of damper body 50. The time required for rotor 20 to descend from its position at the beginning of this stage, shown in FIG. 4, to its final position where it remains for the rest of this stage, shown in FIG. 5, is so short that this descent can be thought of as happening instantaneously. Simultaneous with the descent of sealing O-ring 63 out of contact with first cylindrical bore 52, the upper surface 30 of rotor 20 descends into region 72 of rotor holder 18 in which first and second ears 33, 35 have been machined. This allows the pressurized fluid 14 to exit pressure vessel 12 at a second flow rate R2. Second flow rate R2 is substantially greater than first flow rate R1 because the corresponding exit flow area, second area A2, is substantially increased. As best seen in FIG. 5, the pressurized fluid 14 flowing at second flow rate R2 passes through first and second cylindrical bores 26, 28, contacts the upper surface 30 of rotor 20, makes 90° turns to go radially outward in all directions, then turns downward and exits through holes 17. The minimum or controlling exit flow area in this case is the surface area of an imaginary cylinder 78 that pressurized fluid 14 passes through as it makes its 90° turn. The imaginary cylinder 78, as best seen in FIG. 19, has dimensions based on the diameter D2 of second cylindrical bore 28 and the distance H1, shown in FIG. 15, between the upper end 34 of rotor 20 and the bottom 27 of second cylindrical bore 28. Thus, imaginary cylinder 78 provides second area A2 as the exit flow area for pressurized fluid 14 and second flow rate R2 as the corresponding flow rate.

With reference to FIGS. 5, 8–9, 15, after damping substance passageway 70 opens up, the damping substance can still flow through first damping substance flowpath 66 but now there is also a second fluid path (damping substance passageway 70) of much larger area for the damping substance to flow through. Second collecting region 57 is bordered by the recess 71 in the rotor 20 just above slidable sealing O-ring 63 and first cylindrical bore 52 of the damper body 50. It should be noted that recess 71 has an upper edge formed from ridge 73 on rotor 20 that enters first cylindrical bore 52 just as slidable sealing O-ring 63 descends to the position where it loses contact with first cylindrical bore 52. Ridge 73 extends circumferentially around rotor 20. Opening up damping substance passageway 70, which had previously been unavailable, is a way of providing a drastic decrease in the damping, which is desired.

With reference to FIGS. 4–5, 20, the fifth stage, the lightly damped descent stage, occurs between points 113, 115 along the time axis 102. Point 115 represents the end of the release of pressurized fluid 14 as at this point the pressure inside pressure vessel 12 is substantially zero. Note that the pressure inside pressure vessel 12 in this stage decreases rapidly while the pressure in the receiving tank (not shown) likewise increases rapidly. These relatively rapid changes in pressure demonstrate that the pressurized fluid 114 is only slightly controlled or regulated as it is released. It should be noted that the results of release mechanism 10 shown in Pressure/Time graph 100 have been experimentally shown to be very repeatable.

Self-Relieving Means

Figure 21:
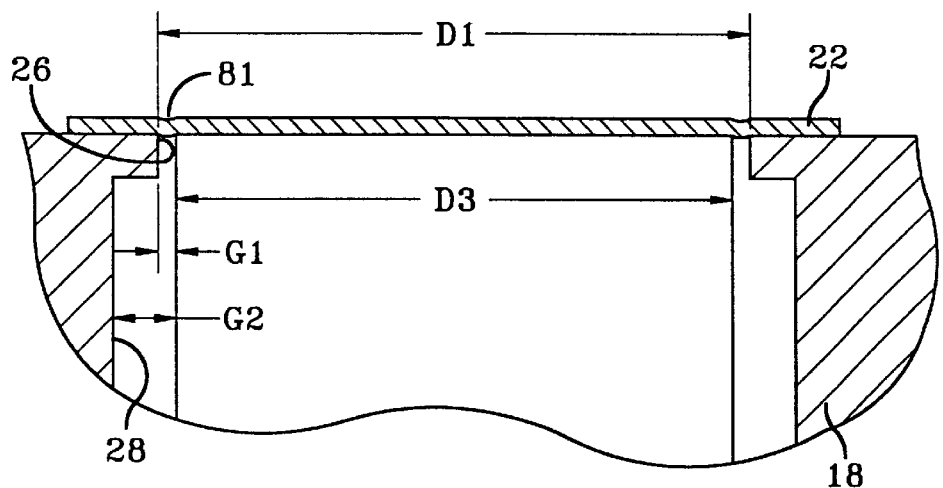
FIG. 21 is a close-up side view of the rotor shown supporting the rupture disc that illustrates the bulging of the unsupported region of the rupture disc.

With reference now to FIGS. 1, 16, 21, another feature generally necessary in the airbag industry is an automatic means of self-relieving the pressurized fluid 14 in pressure vessel 12 should the pressure become too large. An underlying principle of release mechanism 10, as mentioned above, is that rupture disc 22 is weak compared to the pressure of pressurized fluid 14 such that if rupture disc 22 was entirely unsupported it would burst at a pressure far below the operating pressure. As discussed above and shown from a top view in FIG. 16, annular first gap G1 is located outside of rotor 20 between the exterior cylindrical surface 37 of upper end 34 (which has a diameter D3) and the first cylindrical bore 26 of rotor holder 18 (which has a diameter D1). Thus, there is an unsupported region 81 of rupture disc 22 which is relatively small and of annular shape. In extreme close-up, shown in FIG. 21, it can be expected that under normal conditions there will be a slight bulging out of unsupported region 81, providing an annular-shaped rupture disc. This small unsupported region 81 of rupture disc 22 will have a spontaneous rupture pressure. Thus, by designing with sound engineering judgment specific combinations of important variables including, the dimension of unsupported region 81 (typically on the order of a few thousandths of an inch on the diameter), the thickness of rupture disc 22 (also typically on the order of a few thousandths of an inch), the material used to make rupture disc 22, and the internal pressure of pressurized fluid 14 inside pressure vessel 12, the spontaneous rupture pressure of unsupported region 81 can be made to be a desired value. In this way, unsupported region 81 can be used for overpressure self-relief.

Figure 22:
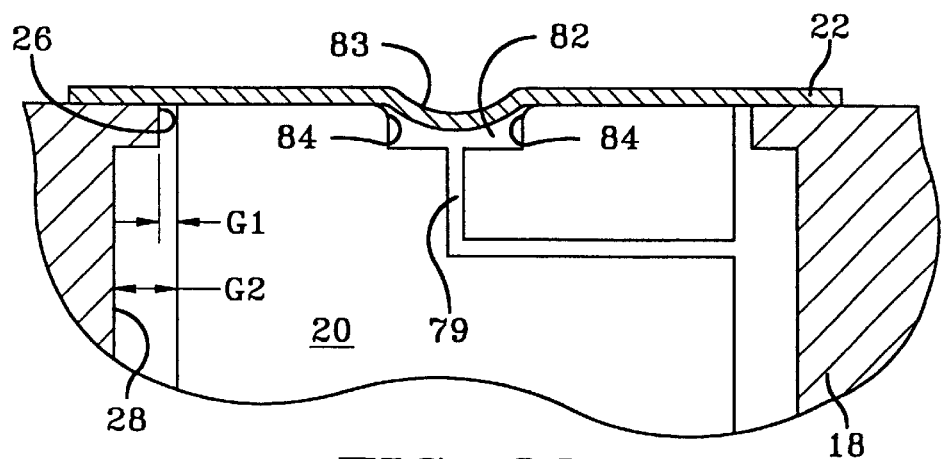
FIG. 22 is a close-up side view of the rotor shown supporting the rupture disc that illustrates a cavity in the top of the rotor where the unsupported region of the rupture disc bulges.

With reference now to FIGS. 1, 22, another way to provide automatic means for self-relieving the pressurized fluid 14 in pressure vessel 12 is to create a cavity 82, as seen in FIG. 22, in the top of rotor 20. This cavity 82, which preferably is a relatively small cylindrical bore centrally located with rounded edges 84, creates an unsupported region 83 of rupture disc 22 over the cavity 82. In extreme close-up, shown in FIG. 22, it can be expected that under normal conditions there will be a slight bulging out of unsupported region 83, providing a circular-shaped rupture disc. This small unsupported region 83 of rupture disc 22 will have a spontaneous rupture pressure. A flow exit path 79 which connects cavity 82 with the exterior region of rotor 20 could be provided if necessary to help pressurized fluid 14 flow to the exterior once unsupported region 83 has ruptured due to overpressure. It should be noted that the strength of rupture disc 22 in a circular geometry, as shown, is related to the ratio of its diameter to its thickness. Thus, it is quite reasonable that unsupported region 83 can be suitably dimensioned to withstand the normal storage pressure of pressurized fluid 14.

With reference to FIG. 1, for a sealed vessel such as pressure vessel 12, generally the only cause that leads to the need for self-relieving means is exposure of the pressurized fluid 14 to excessive temperature. Accordingly, although this is slightly less direct than the self-relieving means by overpressure explained above, another way to achieve self-relief is to automatically relieve the pressurized fluid 14 when the release mechanism 10 reaches a predetermined elevated temperature. As explained above, the protractor 42 used to selectively actuate release mechanism 10 contains a small quantity of explosive material. This explosive material has a characteristic auto-ignition temperature. Thus, when the release mechanism 10 reaches this auto-ignition temperature, the explosive material ignites releasing the pressurized fluid 14. Alternatively, suitable additives could be added to the explosive material such that its auto-ignition temperature can be adjusted to any predetermined value chosen with sound engineering judgement.

Major Embodiment #2

Figure 27:
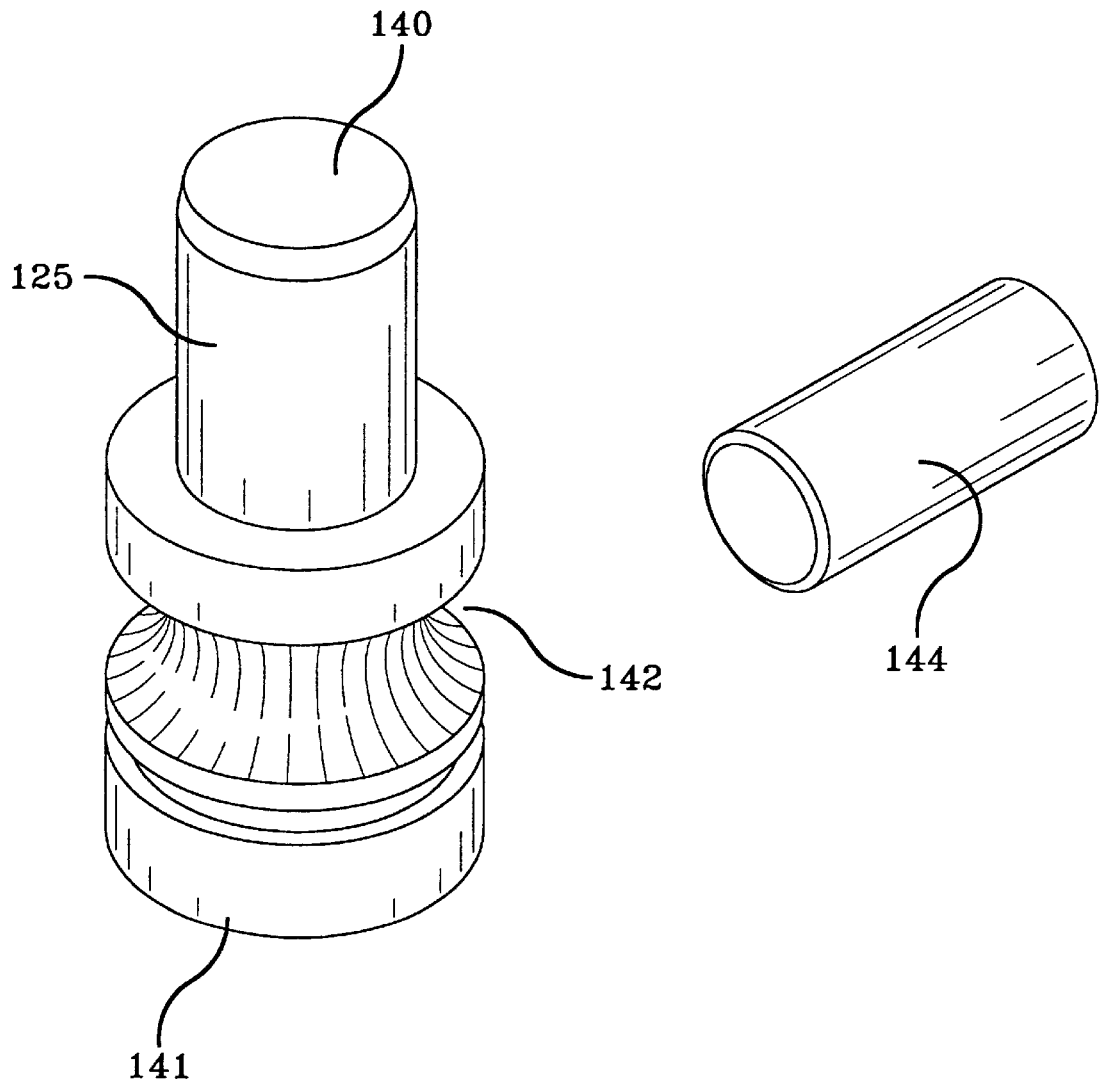
FIG. 27 is a close-up perspective view of the support member and pin used in the release mechanism of FIG. 23.

With reference now to FIGS. 23–28, release mechanism 120, herein after known as the pin-and-drop embodiment, has many features in common with release mechanism 10, the spin-and-drop embodiment (shown in FIG. 1). Release mechanism 120 is for use with a pressure vessel 121 which contains pressurized fluid 122. Pressure vessel 121 is generally cylindrical and necks down to a skirt 123 which has holes 124 for diffusing the pressurized fluid 122 into an associated air bag (not shown). The release mechanism 120 includes support member 125 which is a supporting means that supports rupture disc 126 but, unlike release mechanism 10, it does not have any rotational motion. The only motion of support member 125 is that it drops, or descends, along its axis 127 in direction 128. Support member 125 has an upper end 140 which contacts and supports rupture disc 126, a lower end 141 which operates like a piston, and a groove 142 around its circumference which receives pin 144. As is best seen in FIG. 27, pin 144 which holds support member 125 in place, has a substantially cylindrical cross-section enabling it to fit within groove 142 of support member 125. Pin 144 is slidably positioned within channel 145 which is positioned in skirt 123.

Figure 28:
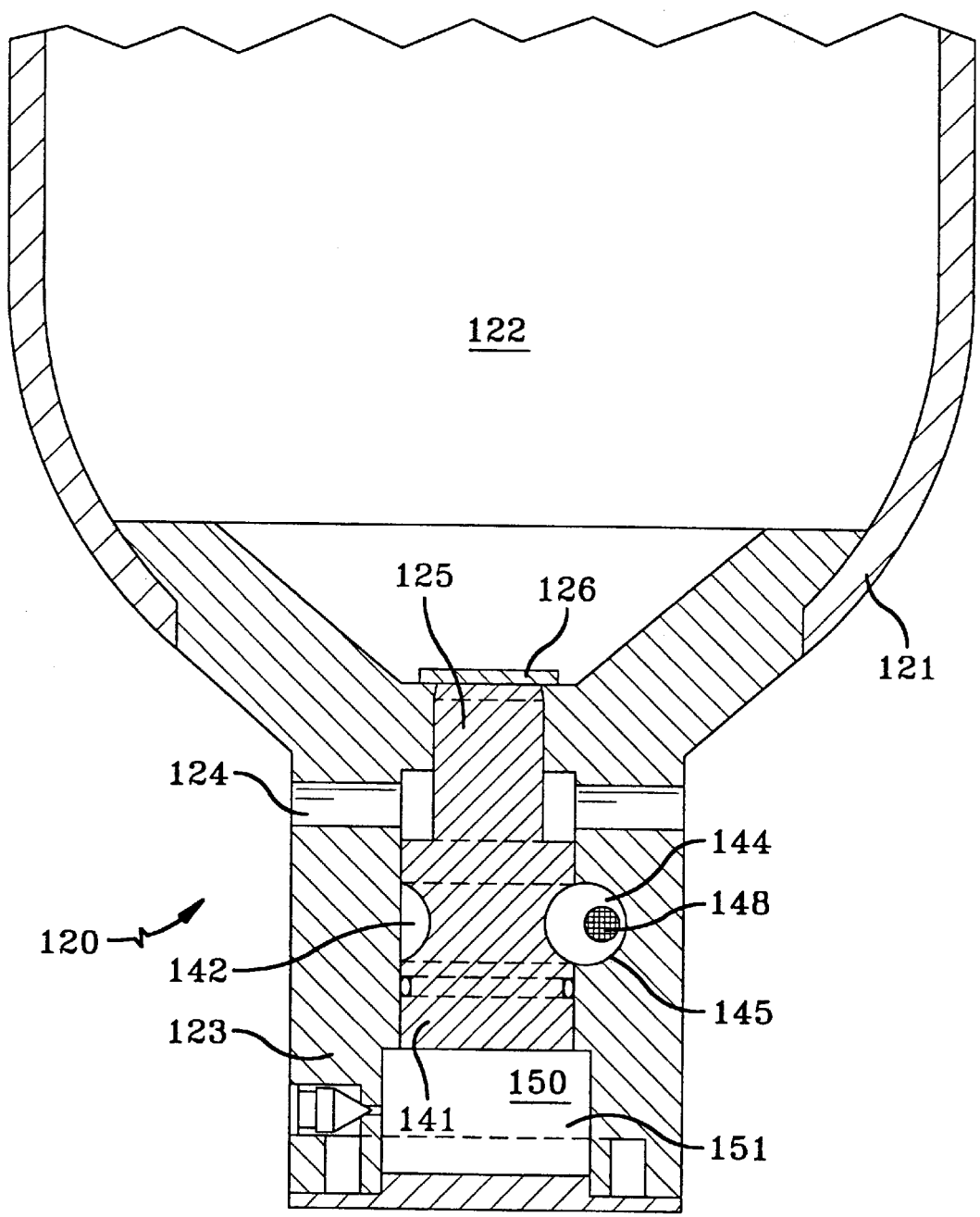
FIG. 28 is a close-up cutaway side view of the release mechanism of FIG. 23 illustrating the contact area on the pin where the protractor piston contacts the pin when its activated.
Figure 29:
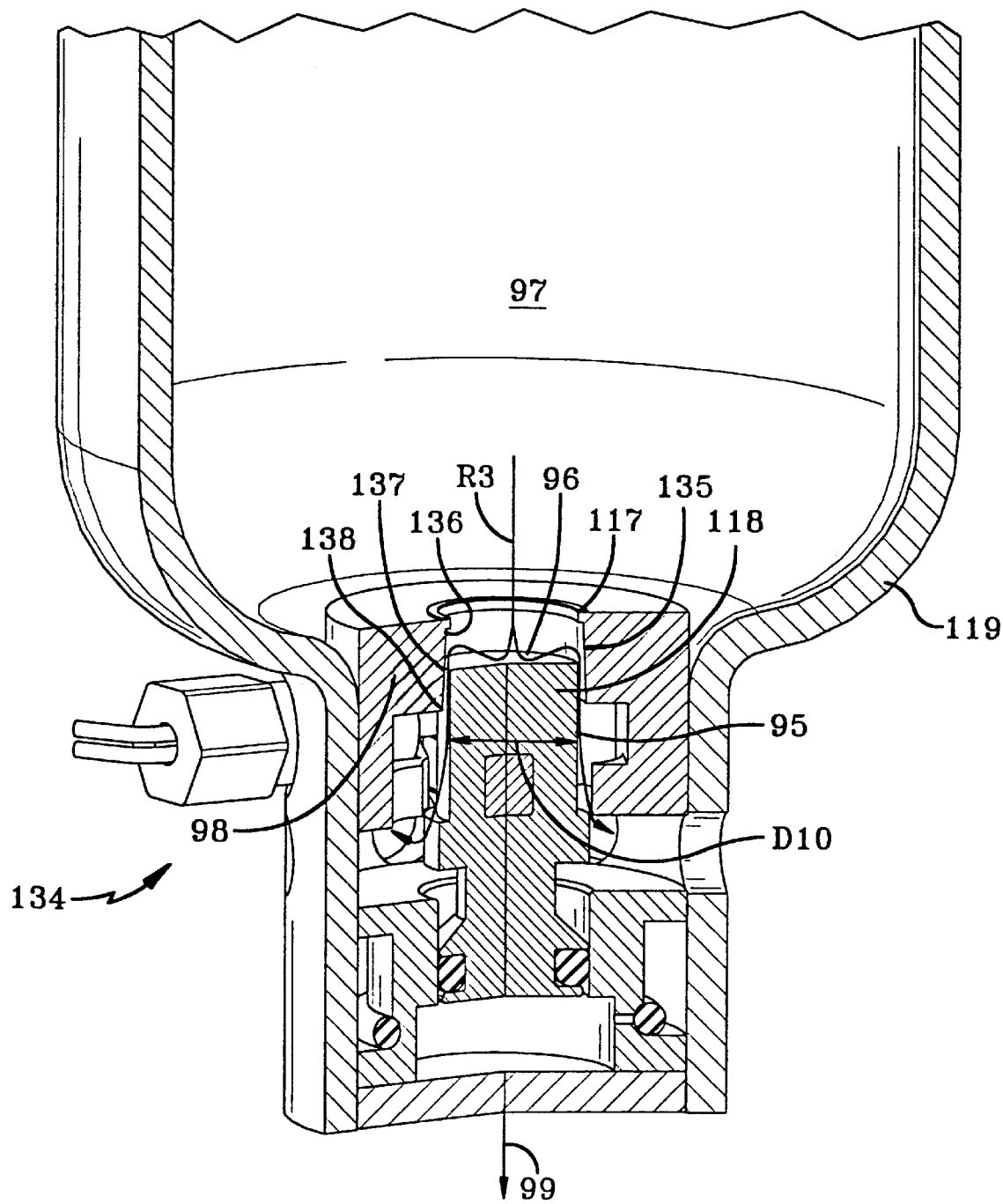
FIG. 29 is a cutaway side view of another spin-and-drop embodiment of this invention illustrating a variable flow rate of pressurized fluid out of the release mechanism.
Figure 30:
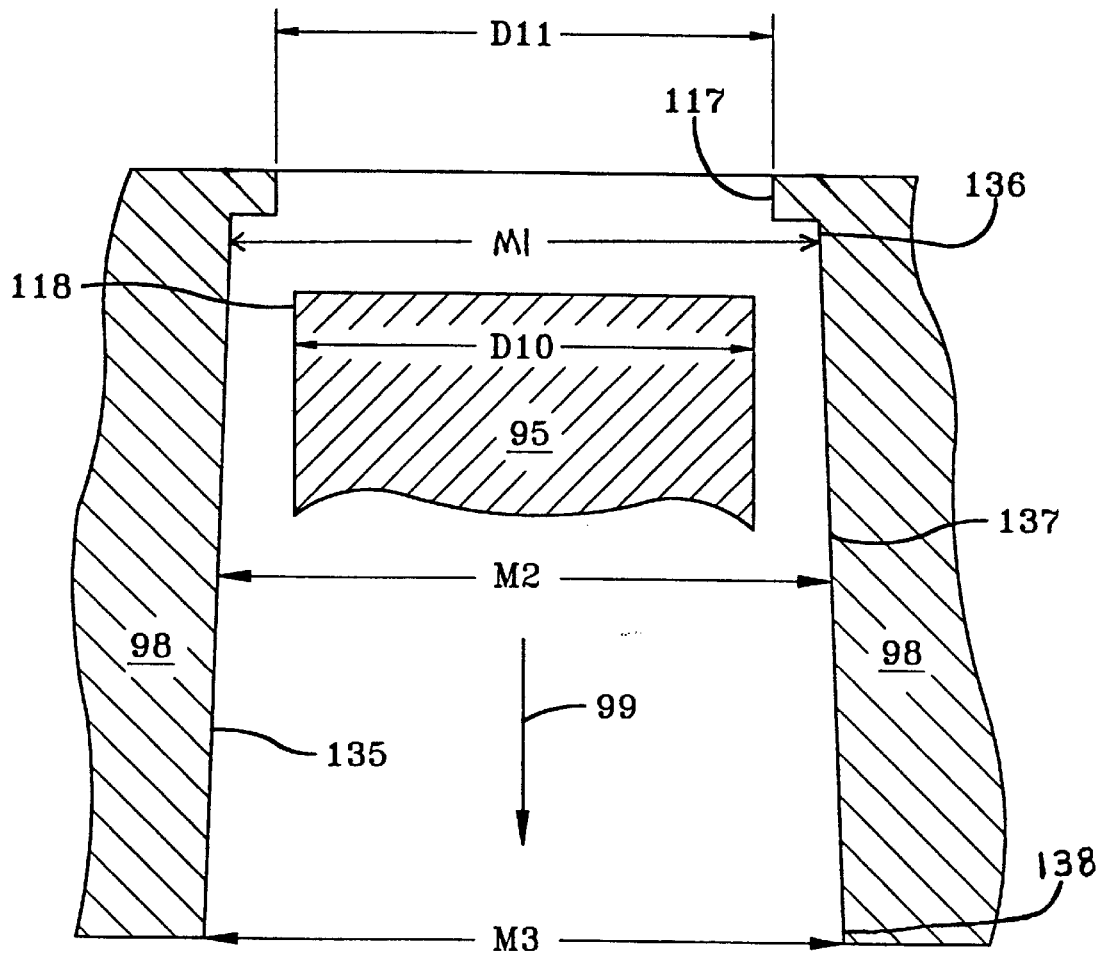
FIG. 30 is a close-up side view of the rotor illustrating that the variable bore provides an increasing exit flow area for the pressurized fluid as the rotor descends.
Figure 31:
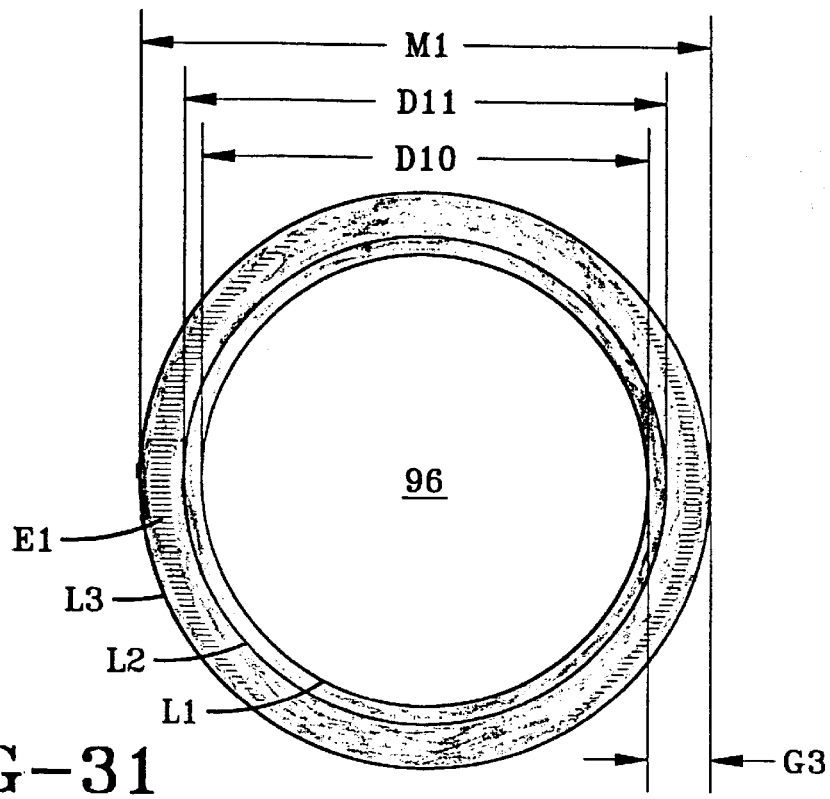
FIG. 31 is a simplified top view that illustrates the exit flow area at the top of the variable bore.
Figure 32:
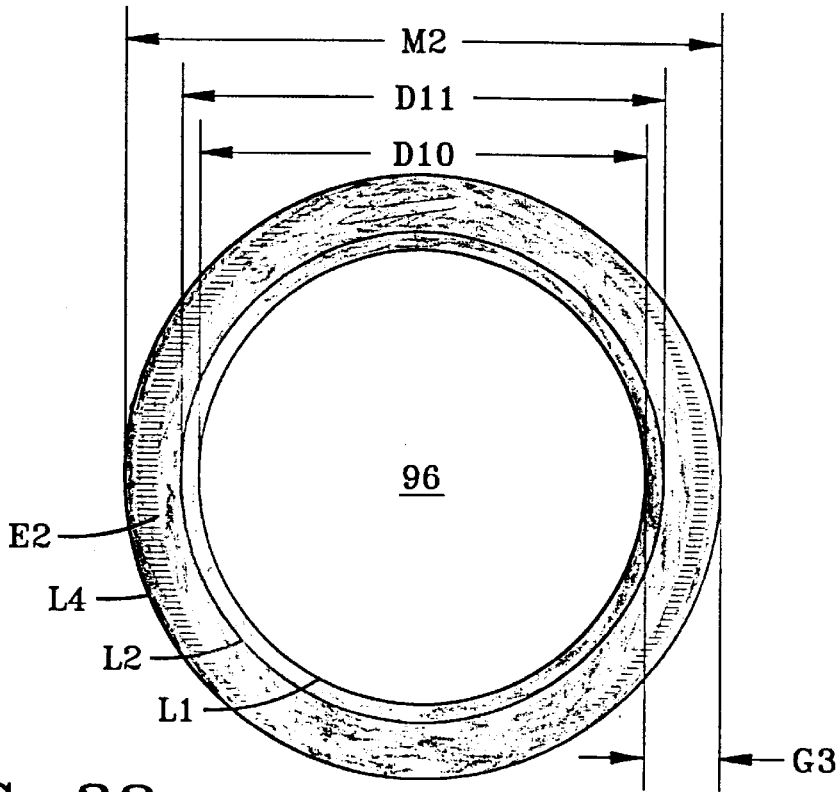
FIG. 32 is a simplified top view that illustrates the exit flow area at the mid-section of the variable bore.
Figure 33:
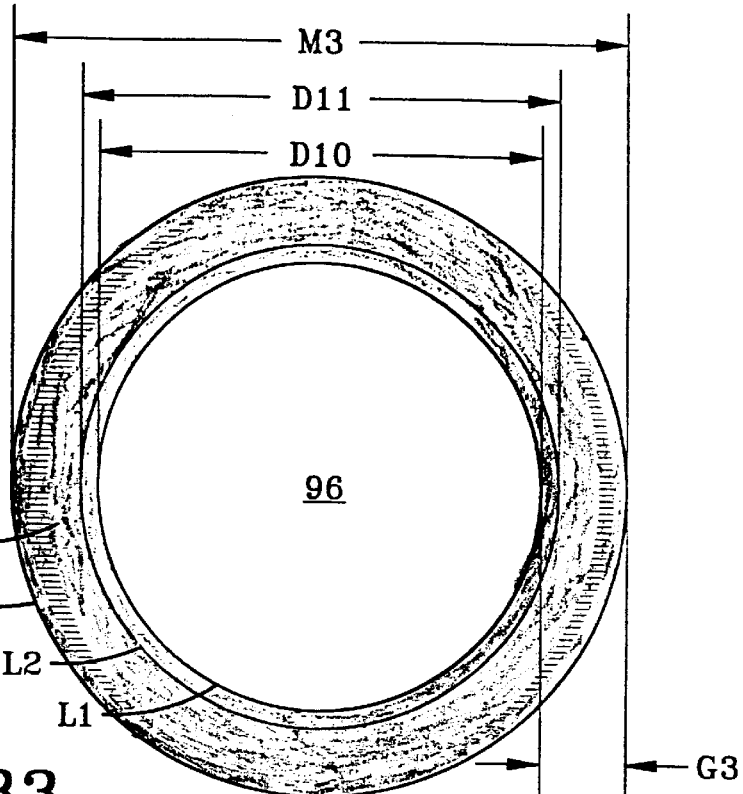
FIG. 33 is a simplified top view that illustrates the exit flow area at the bottom of the variable bore.

With continuing reference to FIGS. 23–28, release mechanism 120 operates in much the same manner as release mechanism 10 (shown in FIG. 1) discussed above except that when protractor 146 extends piston 147, piston 147 slides pin 144 along channel 145 until support member 125 is no longer supported by pin 144. It should be noted that the alignment of piston 147 and pin 144 is off-center. By off-center it is meant that the longitudinal axis of piston 147 and the longitudinal axis of pin 144 are parallel but not precisely colinear. This is illustrated in FIG. 28 which shows the contact area 148 on pin 144 where piston 147 contacts pin 144 when activated. It can be clearly seen that contact area 148 is not concentric with pin 144. This off-center alignment is done so that when piston 147 is extended it does not interfere with the motion of support member 125. Once support member 125 is no longer supported by pin 144, it drops in direction 128, thus removing the support from rupture disc 126 allowing rupture disc 126 to rupture and begin releasing pressurized fluid 122 from pressure vessel 121. Similar to release mechanism 10 (shown in FIG. 1), once support member 125 descends through a free descent stage, its lower end 141 contacts damping substance 150 located in holding region 151 where the continued descent of support member 125 is damped.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:
What is claimed is:

1. A release mechanism for releasing pressurized fluid from an associated pressure vessel having an opening, the release mechanism comprising:
    sealing means for use in sealing the opening of the associated pressure vessel;
    supporting means for supporting said sealing means;
    opening means for selectively opening said sealing means, said opening means selectively removing said supporting means; and,
    damping control means for damping the motion of said supporting means, said damping control means also regulating the release of pressurized fluid.

2. The release mechanism of claim 1 wherein said supporting means comprises:
    a rotor, said rotor selectively rotatable about its axis, said rotor selectively moveable along its axis.

3. The release mechanism of claim 2 wherein said supporting means further comprises:
    a rotor holder for holding said rotor in supporting relation with said sealing means, said rotor holder being fixedly attached to the associated pressure vessel.

4. The release mechanism of claim 3 wherein said rotor holder comprises:
    first and second cylindrical bores, said rotor selectively movable within said first and second cylindrical bores.

5. The release mechanism of claim 3 wherein said rotor holder comprises:
    a first cylindrical bore; and,
    a variable bore, said rotor selectively moveable within said first cylindrical bore and said variable bore.

6. The release mechanism of claim 5 wherein said variable bore is cone-shaped.

7. The release mechanism of claim 3 wherein said rotor has a first arm, said rotor holder comprising:
    a first ear, said first ear receiving said first arm, said first arm selectively movable out of contact with said first ear.

8. The release mechanism of claim 7 wherein said rotor has a second arm, said rotor holder further comprising:
    a second ear, said second ear receiving said second arm, said second arm selectively movable out of contact with said second ear, said first and second arms extending out substantially perpendicularly from said rotor.

9. The release mechanism of claim 8 wherein the contacting surfaces of said first and second arms and the surfaces of said first and second ears lie in a plane which is substantially perpendicular to the axis of rotation of said rotor.

10. The release mechanism of claim 9 wherein said first and second arms fall off said first and second ears at substantially the same angular position.

11. The release mechanism of claim 9 further comprising:
    measuring means for measuring the pressure of the pressurized fluid.

12. The release mechanism of claim 11 wherein said measuring means comprises:
    a force-sensing pad, said force-sensing pad positioned between said first arm and said first ear.

13. The release mechanism of claim 8 wherein said first arm comes out of contact with said first ear when said rotor rotates through a predetermined angular rotation in the range of 10°–30°.

14. The release mechanism of claim 2 wherein said rotor has a lower end which operates like a piston.

15. The release mechanism of claim 14 wherein said rotor has an upper end with an upper surface, said lower end having a bottom surface, said upper surface having an area substantially the same as the area of said bottom surface.

16. The release mechanism of claim 2 wherein said opening means comprises:
    actuation means, said actuation means selectively rotating said rotor.

17. The release mechanism of claim 16 wherein said actuation means is a self-contained protractor.

18. The release mechanism of claim 2 wherein said opening means comprises:
    a non-contained explosive device.

19. The release mechanism of claim 1 wherein said damping control means comprises:
    a damping substance, said damping substance damping the motion of said supporting means.

20. The release mechanism of claim 19 wherein said damping control means further comprises:
    a damper body having a cylinder with a first cylindrical bore, said cylinder receiving said supporting means;
    a first collecting region for collecting said damping substance; and,
    a first bleed hole, said first bleed hole connecting said cylinder to said first collecting region, said damping substance selectively flowable through said first bleed hole.

21. The release mechanism of claim 20 wherein the associated pressure vessel and said damper body form the boundaries of said first collecting region.

22. The release mechanism of claim 20 wherein said damping control means further comprises:
    adjusting means for selectively adjusting the flow area of said first bleed hole.

23. The release mechanism of claim 20 wherein said damping control means further comprises:
    a second bleed hole, said second bleed hole connecting said cylinder to said first collecting region, said damping substance selectively flowable through said second bleed hole, said first and second bleed holes being selectively openable.

24. The release mechanism of claim 20 wherein said damping control means further comprises:
    sealing means for sealing said first bleed hole, said sealing means selectively permitting said damping substance to flow through said first bleed hole.

25. The release mechanism of claim 24 wherein said sealing means comprising:

an O-ring, said O-ring positioned on the outer surface of said damper body.

26. The release mechanism of claim 20 wherein said damping control means further comprises:

a compressible material, said compressible material located with said damping substance within said cylinder.

27. The release mechanism of claim 20 wherein said cylinder has a second cylindrical bore, said damping control means further comprising:

a second collecting region for collecting said damping substance; and, a damping substance passageway, said damping substance passageway connecting said cylinder to said second collecting region.

28. The release mechanism of claim 27 wherein said damper body and said supporting means form the boundaries of said second collecting region.

29. The release mechanism of claim 20 further comprising:

slidable sealing means for sealing said damping substance within said first collecting region, said slidable sealing means selectively slidable within said first cylindrical bore of said cylinder, said supporting means having a groove for receiving said slidable sealing means.

30. The release mechanism of claim 29 wherein said slidable sealing means is selectively slidable out of sealing contact with said first cylindrical bore.

31. The release mechanism of claim 1 wherein said supporting means comprises a rotor, said rotor selectively rotatable about its axis, said rotor selectively moveable along its axis, said damping control means comprising:

a piston, said piston selectively moveable along its axis.

32. The release mechanism of claim 31 wherein a gap is provided between said rotor and said piston, said rotor selectively movable into operative contact with said piston.

33. The release mechanism of claim 1 wherein said supporting means comprises:

a support member, said support member selectively moveable along its axis; and, a pin, said pin for use in holding said piston in supporting relation with said sealing means, said pin selectively slidable by said opening means out of holding relation with said piston.

34. The release mechanism of claim 33 wherein said support member comprises:

an upper end, said upper end supporting said sealing means;

a lower end, said lower end operating like a piston, and a groove, said groove receiving said pin.

35. The release mechanism of claim 33 wherein said opening means comprises:

a piston actuator having an extendable piston, said pin selectively slidable by said extendable piston, said extendable piston and said pin being substantially off-center.

36. The release mechanism of claim 1 further comprising:

self-relieving means for automatically self-relieving the pressurized fluid.

37. The release mechanism of claim 36 wherein said self-relieving means comprises:

an unsupported region in said sealing means.

38. The release mechanism of claim 37 wherein said unsupported region is annularly shaped and located outside of said supporting means.

39. The release mechanism of claim 37 wherein said supporting means has a cavity, said unsupported region located over said cavity.

40. The release mechanism of claim 39 wherein said self-relieving means further comprises:

a flow exit path, said flow exit path connecting said cavity with an exterior region of said supporting means.

41. The release mechanism of claim 36 wherein said opening means comprises an explosive material with a characteristic auto-ignition temperature, said self-relieving means being achieved when the release mechanism reaches said auto-ignition temperature.

* * * * *